US008768580B2

(12) United States Patent
Mizuochi et al.

(10) Patent No.: US 8,768,580 B2
(45) Date of Patent: Jul. 1, 2014

(54) OPERATION MACHINE

(75) Inventors: Mariko Mizuochi, Ibaraki (JP); Akinori Ishii, Tsuchiura (JP); Jinichi Yamaguchi, Hino (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 247 days.

(21) Appl. No.: 13/502,598

(22) PCT Filed: Oct. 19, 2010

(86) PCT No.: PCT/JP2010/068356

§ 371 (c)(1), (2), (4) Date: May 23, 2012

(87) PCT Pub. No.: WO2011/049079

PCT Pub. Date: Apr. 28, 2011

(65) Prior Publication Data

US 2012/0232763 A1 Sep. 13, 2012

(30) Foreign Application Priority Data

Oct. 19, 2009 (JP) ................................ 2009-240511

(51) Int. Cl.

*B66F 17/00* (2006.01)
*G01M 1/12* (2006.01)

(52) U.S. Cl.

USPC ............................................ 701/50; 701/124

(58) Field of Classification Search

CPC ..... B66C 23/90; B66F 9/07559; B66F 17/00; E02F 9/2257; B60R 16/0233; B60R 2021/01306; B62D 49/08; G01M 1/122

USPC ................. 701/38, 45, 50, 124; 180/282, 290

See application file for complete search history.

(56) References Cited

U.S. PATENT DOCUMENTS

| | | | | | |
|---|---|---|---|---|---|
| 4,284,987 | A * | 8/1981 | Gibson et al. | ................. | 340/689 |
| 5,160,055 | A * | 11/1992 | Gray | ............................ | 212/278 |
| 6,991,119 | B2 * | 1/2006 | Puszkiewicz et al. | ........ | 212/277 |
| 2009/0112409 | A1 * | 4/2009 | Tollenaar | ........................ | 701/50 |
| 2010/0322753 | A1 * | 12/2010 | Brooks et al. | ................ | 414/718 |

FOREIGN PATENT DOCUMENTS

| | | |
|---|---|---|
| JP | 5-319785 | 12/1993 |
| JP | 7-180192 | 7/1995 |
| JP | 7-247578 | 9/1995 |
| JP | 2871105 | 1/1999 |
| JP | 2006-150567 | 6/2006 |
| JP | 2008-12642 | 1/2008 |

* cited by examiner

*Primary Examiner* — Jason Holloway

(74) *Attorney, Agent, or Firm* — Antonelli, Terry, Stout & Kraus, LLP.

(57) ABSTRACT

Disclosed is a working machine that computes and displays moment by moment its dynamic stability and its state of contact with a ground in view of an inertia force and an external force applied to the working machine. Specifically, a working machine is provided with an undercarriage, a working machine main body mounted on the undercarriage, a front working mechanism attached pivotally in an up-and-down direction to the working machine main body, and a working attachment connected to a free end of the front working mechanism. The working machine includes a ZMP computing means for calculating coordinates of a ZMP by using position information, acceleration information and external force information on respective movable portions of the main body, which includes the front working mechanism, and undercarriage, and a stability computing means for calculating a support polygon formed by plural ground points of the working machine with a ground, and, when the ZMP is included in a warning region formed inside a perimeter of the support polygon, producing a tipping warning sound. The ZMP and the support polygon, which includes the warning region, is computed, and a display or warning is produced.

6 Claims, 17 Drawing Sheets

OPERATION MACHINE

TECHNICAL FIELD

This invention relates to a working machine, and specifically to a working machine useful in construction work, demolition work, civil engineering work and/or the like.

BACKGROUND ART

Known as construction machines employed in construction work, demolition work, civil engineering work and/or the like include those having an upperstructure mounted rotatably on an undercarriage and a multi-articulated front working mechanism attached pivotally up and down to the upperstructure. As one example of such working machines, there is a demolition work machine constructed by using a hydraulic excavator as a base.

Such a working machine includes a front working mechanism, which is composed of a boom and arm and is connected pivotally up and down to an upperstructure via a joint, and a grapple, bucket, breaker, crusher or the like attached to a free end of the arm via a joint, so that it can perform work such as demolition work of structural objects or dismantling work of waste.

Work by such a working machine is performed by variously changing its posture with a boom, arm and working attachment (which will be represented by a bucket), which make up a front working mechanism, being kept extending to an outside of the upperstructure. The working machine may, therefore, tip over if an unreasonably aggressive operation is performed.

As a conventional technology for this problem, Patent Document 1 may be referred to, for example. According to the technology disclosed in Patent Document 1, a working machine is provided at its boom and arm with angle sensors, respectively, a controller is arranged in the working machine, and detection signals from the angle sensors are inputted to the controller. The controller computes, based on the detection signals, a barycentric position of the entire working machine and bearing power at each steady supporting point in a ground contact area of an undercarriage, and based on the results of the computation, displays on a display the values of bearing power at the respective steady supporting points. The controller is also configured to produce a warning when the bearing power at a rear steady supporting point of the working machine has decreased to a threshold limit value for the assurance of safe work.

As another example, reference may also be had to Patent Document 2, for example. According to the technology disclosed in Patent Document 2, a working machine is provided with angle sensors for detecting its boom angle, arm angle and bucket angle and a swing angle of its upperstructure and also with a tilt angle sensor for detecting a longitudinal tilt of a body. Based on these angle sensors and the dimensions of predetermined parts of the body, the static tipping moment of the working machine is computed.

In addition, the dynamic tipping moment produced under a centrifugal force as a result of rotation of the upperstructure is also computed by using a rotational angular velocity of the upperstructure, and moreover, the dynamic tipping moment produced at the time of a sudden stop of the upperstructure is also computed by using the maximum angular acceleration of the rotation. Either one or greater one of these dynamic tipping moments is added to the static tipping moment, and its magnitude is employed as a condition for the determination of tipping. Under the determination condition so established, the rotational angular velocity is controlled.

As a further example, reference may be had to Patent Document 3, for example. The technology disclosed in Patent Document 3 includes sensors for detecting a posture and motion of a main body of a construction machine and a work load on the main body of the construction machine. With reference to data base, a model is built based on detection values of these sensors such that the model can represent current and future mechanical behaviors on the posture of the main body of the construction machine to determine whether or not the main body of the construction machine would tip over. When tipping is predicted, the working operation under performance is stopped, and moreover, an operation is initiated to avoid tipping, thereby making it possible to avoid tipping. This technology is also configured such that, when tipping is predicted, an operator is notified accordingly.

PRIOR ART DOCUMENTS

Patent Documents

Patent Document 1: JP-B-2871105
Patent Document 2: JP-A-7-180192
Patent Document 3: JP-A-5-319785

DISCLOSURE OF THE INVENTION

Problem to be Solved by the Invention

In view of actual work by a working machine, an inertia force is produced during the work by a motion of a front attachment mechanism or a motion of the working machine itself, and this inertia force plays a significant part in the stability of the working machine.

In the working machine, its motion changes moment by moment, and the stability also varies with the change in motion. It is, therefore, necessary to also perform the evaluation of the stability moment by moment and to notify an operator of the evaluation results without delay.

Further, the working machine is used in a variety of work. Depending on the operation such as, for example, in a jack-up operation that a front working mechanism is pressed at a free end thereof against the ground to lift up a main body, the state of its contact with the ground surface may change. To also accurately discriminate the stability even in such a case, there is a need to continually detect the state of ground contact and to perform the determination of stability responsive to every change in the state of ground contact.

With the conventional technologies, however, no proposal has been made yet as to a determination means that enables to calculate and determine the stability of a working machine moment by moment while taking an inertia force into consideration. Moreover, no study has been made yet on such an operation that the points of contact of a working machine with the ground surface changes, for example, when a blade is in contact with the ground or the working machine is in a jacked-up state.

The present invention has been made in view of these problems, and provides a working machine that can compute the dynamic stability of the working machine and the state of contact of the working machine with the ground while taking into consideration an inertia force or external force applied moment by moment to the working machine and can produce a display and warning without delay.

Means for Solving the Problems

To solve the above-described problems, the present invention has adopted a means such as that to be described next:

A working machine provided with an undercarriage, a working machine main body mounted on the undercarriage, a front working mechanism attached pivotally in an up-and-down direction to the working machine main body, and a working attachment connected to the front working mechanism via a pin, comprising:

a ZMP computing means operably arranged to calculate coordinates of a ZMP by using position vectors, acceleration vectors and external force vectors at respective mass points constituting the main body, which includes the front working mechanism, and undercarriage, and a stability computing means operably arranged to calculate a support polygon formed by connecting plural ground points of the working machine with a ground such that no concave shape is allowed, and, when the ZMP is included in a warning region formed inside a perimeter of the support polygon, producing a tipping warning, wherein the ZMP computing means and stability computing means compute and display the ZMP and the support polygon including the warning region.

Advantageous Effects of the Invention

The present invention is provided with the above-described features, and therefore, can compute moment by moment the dynamic stability of the working machine and the state of contact of the working machine with the ground while taking into consideration an inertia force or external force applied to the working machine, and can display them without delay.

MODES FOR CARRYING OUT THE INVENTION

First Embodiment

A description will hereinafter be made about the first embodiment of the present invention.

<Hardware Configuration>

<Main Body>

Figure 1:
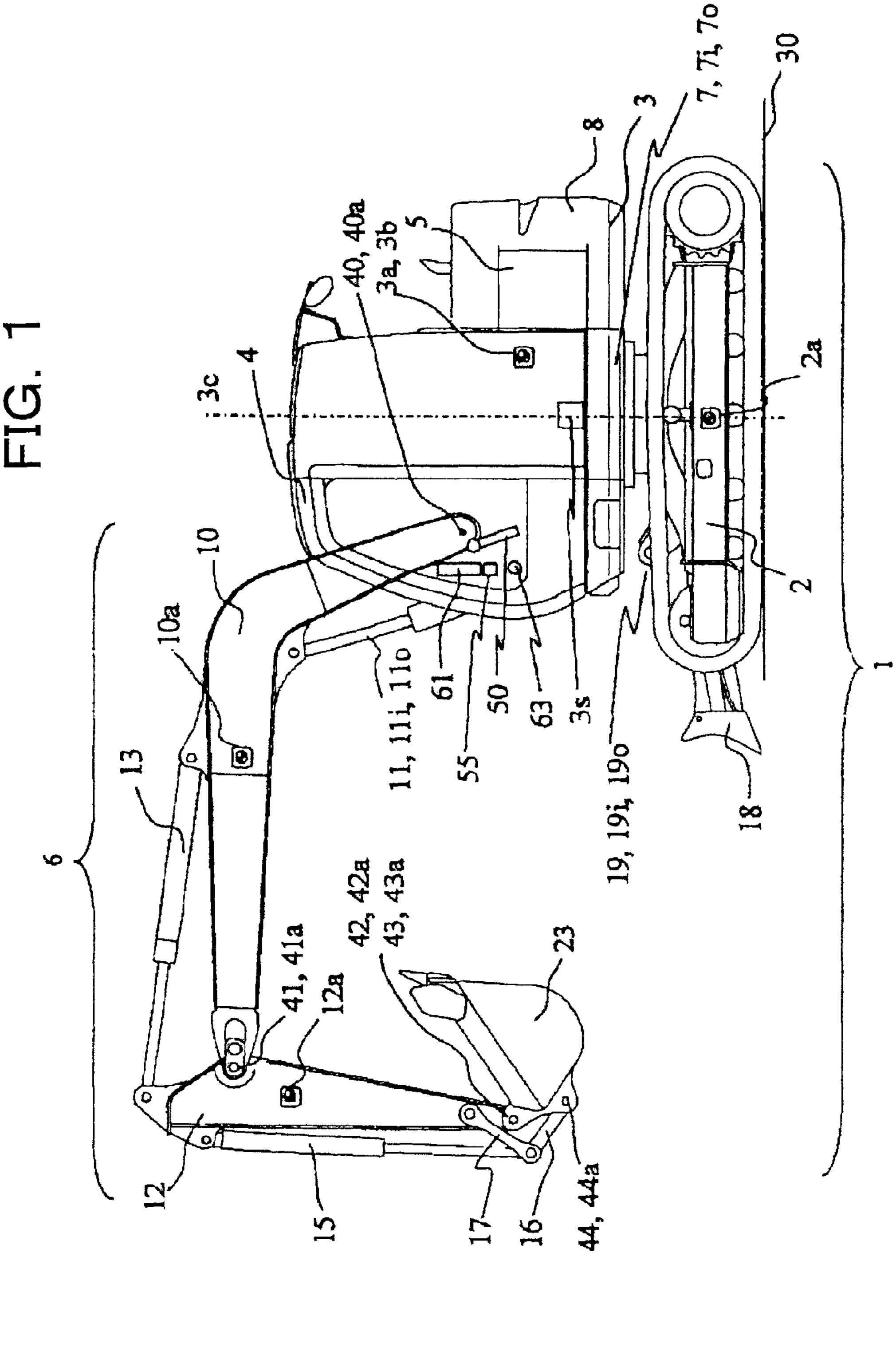
FIG. 1 is a schematic side view showing a working machine according to a first embodiment.

FIG. 1 is a schematic side view showing a working machine according to the first embodiment. In the working machine 1 according to the first embodiment, an upperstructure 3 is rotatably mounted on an undercarriage 2, and the upperstructure 3 is rotatably driven by a swing motor 7. On the upperstructure 3, an operator's cab 4 and an engine 5 are mounted. On a rear part of the upperstructure 3, a counterweight 8 is mounted. In addition, a controller 60 that controls the entire working machine 1 is arranged to make up the working machine 1.

<Front Working Mechanism>

On the upperstructure 3, a boom 10 is arranged pivotally up and down via a fulcrum 40 as a joint, and on a free end of the boom 10, an arm 12 is pivotally arranged via a fulcrum 41 as a joint. Further, on a free end of the arm 12, a bucket 23 is pivotally arranged as a working attachment via a fulcrum 42 as a joint. It is to be noted that the boom 10 and arm 12 make up a front working mechanism 6.

An boom cylinder 11 is an actuator for driving the boom 10 such that it pivots about the fulcrum 40, and is connected to the upperstructure 3 and the boom 10.

An arm cylinder 13 is an actuator for driving the arm 12 such that it pivots about the fulcrum 41, and is connected to the boom 10 and the arm 12.

A working attachment 15 is an actuator for driving the bucket 23 such that it pivots about the fulcrum 42, and is connected to the bucket 23 via a link 16 and also to the arm 12 via a link 17. It is to be noted that the bucket 23 can be replaced to another working attachment such as a grapple, cutter or breaker.

<Operator's Cab>

The upperstructure 3 is provided with the operator's cab 4 for an operator who operates the working machine 1. Arranged in the operator's cab 4 are a control device 50 for inputting operating instructions from the operator to various drive actuators, a display (display means) 61 for displaying a support polygon, ZMP coordinates and the like, which will be described subsequently herein, a warning device (warning means) 63 for producing a tipping warning sound or the like with respect to the working machine 1, a user setting input device 55 for allowing the operator to perform various settings, and so on.

<Blade>

A blade 18 is arranged pivotally up and down on a front wall of the undercarriage 2, and the blade 18 is driven by a blade cylinder 19.

<Sensors>

<Posture Sensor>

The upperstructure 3 is provided with a posture sensor 3*b* for detecting a tilt of the below-described machine reference coordinate system relative to a world coordinate system that uses, as a Z-axis, a direction opposite to the gravity. The posture sensor 3*b* is, for example, a tilt angle sensor, and by detecting a tilt angle of the upperstructure 3, detects a tilt of the machine reference coordinate system relative to the world coordinate system.

<Angle Sensors>

On a center line 3*c* of rotation of the upperstructure 3, a swing angle sensor 3*s* is arranged to detect a swing angle of the upperstructure 3 relative to the undercarriage 2.

At the fulcrum 40 between the upperstructure 3 and the boom 10, a boom angle sensor (angle sensor) 40*a* is arranged to measure a pivot angle of the boom 10.

At the fulcrum 41 between the boom 10 and the arm 12, an arm angle sensor (angle sensor) 41*a* is arranged to measure a pivot angle of the arm 12.

At the fulcrum 42 between the arm 12 and the bucket 23, a bucket angle sensor 42*a* is arranged to measure a pivot angle of the bucket 23.

<Acceleration Sensors>

In the neighborhoods of the centers of gravity of the undercarriage 2, upperstructure 3, boom 10 and arm 12, an undercarriage acceleration sensor 2*a*, upperstructure acceleration sensor 3*a*, boom acceleration sensor 10*a* and arm acceleration sensor 12*a* are arranged, respectively.

<Pin Force Sensors>

A pin 43, which connects the arm 12 and the bucket 23 together, and a pin 44, which connects the link 16 and the bucket 23 together, are provided with pin force sensors 43*a*, 44*a*, respectively. As the pin force sensors 43*a*, 44*a*, strain gauges are inserted, for example, in cylindrical bores. By measuring strains produced on the strain gauges, the magnitudes and directions of forces (external forces) applied to the pins 43,44 are detected.

<Pressure Sensors>

The swing motor 7, which rotates the upperstructure 3, is provided with swing motor pressure sensors 7*i* and 7*o* for detecting a suction-side pressure and delivery-side pressure of a hydraulic pressure that is driving the swing motor 7. Further, the blade cylinder 19 is provided with blade cylinder pressure sensors 7*i* and 7*o* for detecting a suction-side pressure and delivery-side pressure of a hydraulic pressure that is driving the blade cylinder 19.

<Controller>

Figure 2:
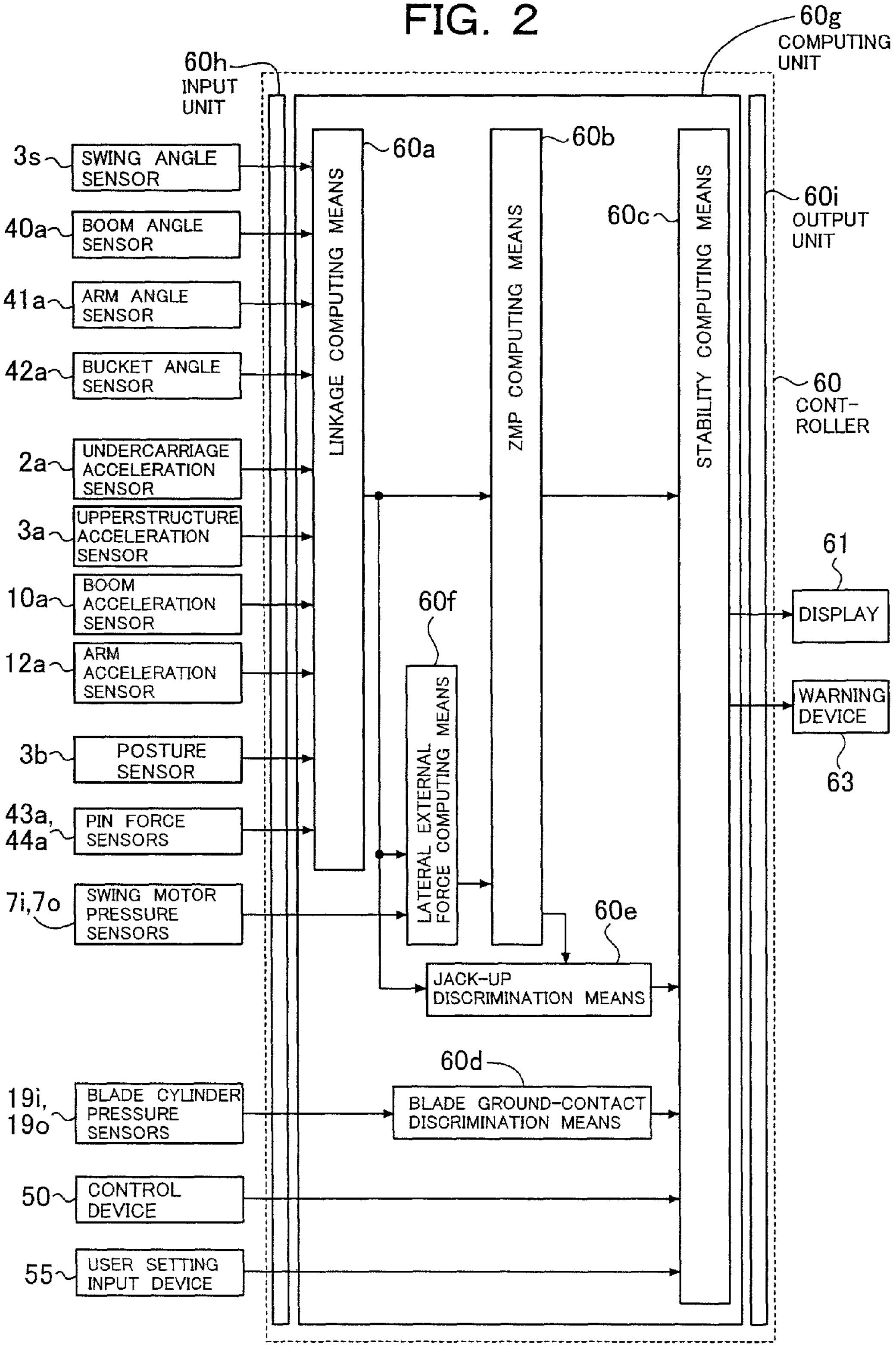
FIG. 2 is a block diagram illustrating the configuration of a control system of the working machine.

FIG. 2 is a schematic configuration diagram of a controller which the working machine 1 provided with. The controller 60 is provided with an input unit 60*h* in which signals are inputted from the respective sensors arranged at the corresponding parts of the working machine 1, a computing unit 60*g* for receiving the signals inputted in the input unit 60*h* and performing predetermined computations, and an output unit 60*i* for receiving output signals from the computing unit 60*g* and outputting safety information and tipping warning information on the working machine 1 (see FIG. 1). It is to be noted that the display 61 displays the safety information and tipping warning information on the working machine 1, and the warning device 63 produces a warning on tipping.

The computing unit 60*g* is constructed of an unillustrated microcomputer, an unillustrated peripheral circuitry, and so on. The microcomputer is provided with CPU (Central Processing Unit) and a memory unit including ROM (Read Only Memory), RAM (Random Access Memory), a flash memory and the like. The computing unit 60*g* operates according to a program stored, for example, in the ROM.

<Reference Coordinate System>

Figure 3:
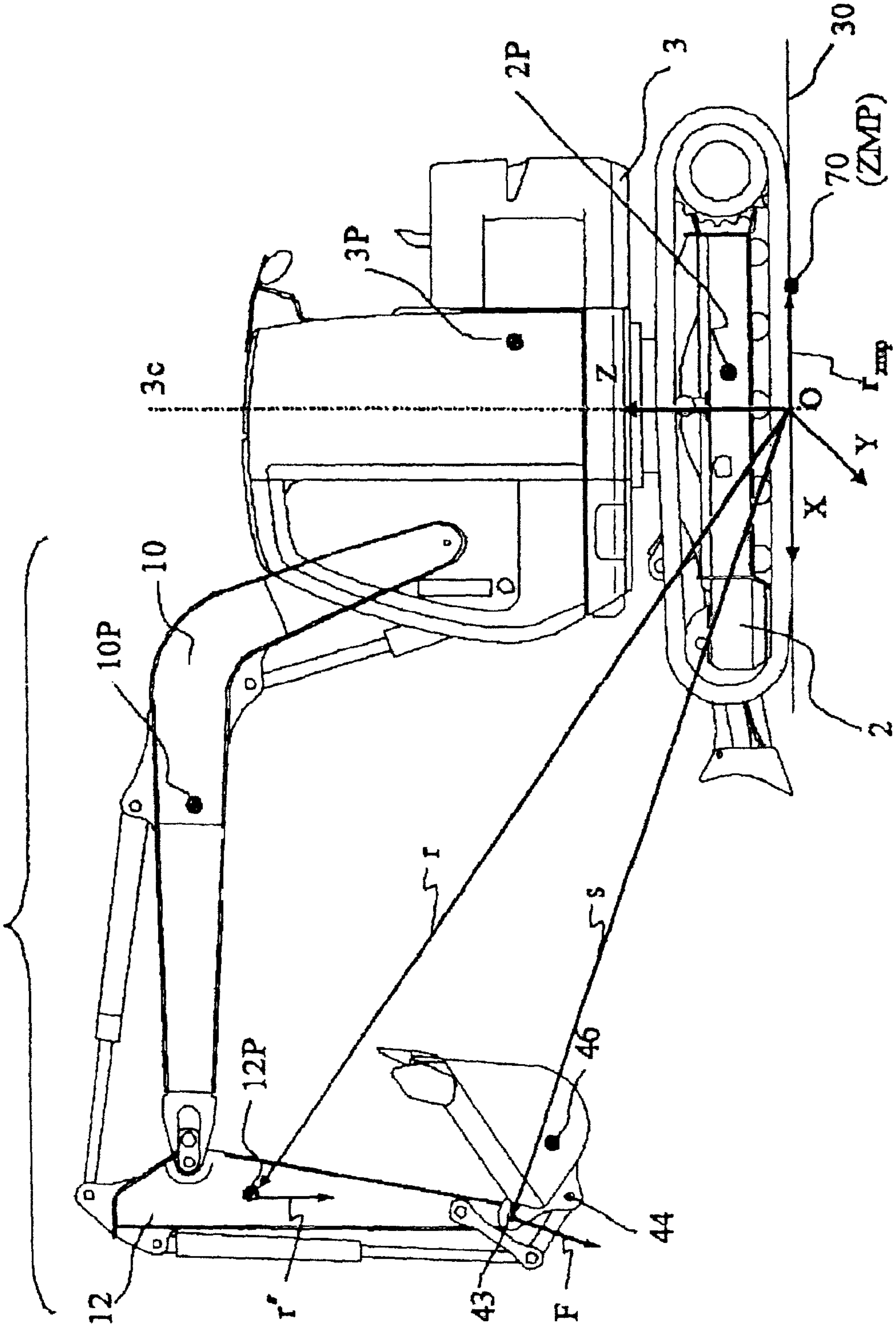
FIG. 3 is a schematic side view showing a computing model of the working machine.

FIG. 3 is a schematic side view showing a ZMP-computing model of the working machine having the controller. A world coordinate system (O-XYZ) and a machine reference coordinate system (O-XYZ) are set as shown in FIG. 3. The world coordinate system uses the direction of the gravity as a reference, and also uses, as a Z-axis, a direction opposite to the gravity. The machine reference coordinate system uses the undercarriage 2 as a reference.

The machine reference coordinate system is assumed to belong to the undercarriage 2. As shown in FIG. 3, the origin of the machine reference coordinate system is set at a point O which is located on the center line 3*c* of rotation of the upperstructure 3 and is in contact with a ground surface 30, and an X-axis, Y-axis and Z-axis are set in a longitudinal direction, lateral direction and vertical direction of the undercarriage 2, respectively.

<Model>

In the first embodiment, a lumped mass model in which respective structural members are assumed to have their masses lumping at their centers of gravity as shown in FIG. 3 is used as a model for computing a ZMP 70 in view of the simplicity of assembly. Mass points 2P,3P,10P,12P of the undercarriage 2, upperstructure 3, boom 10 and arm 12 are set at the barycentric positions of the respective structural members, and the masses at the respective mass points are assumed to be m2,m3,m10,m12, respectively. In addition, the position vectors at the respective mass points are assumed to be r2,r3, r10,r12, and the acceleration vectors at the respective mass points are assumed to be r"2,r"3,r"10,r"12, respectively.

It is to be noted that the setting method of mass points is not limited to the above-described one and, for example, positions at which masses lump (the engine 5, counterweight 8 and the like, which are shown in FIG. 1) may be added.

When work is performed by the bucket 23, an external force is applied to a tip of the bucket 23. As the bucket 23 is connected to the front working mechanism 6 via the pins 43,44, the gravity and inertia force of the bucket 23 and external forces applied in the direction of the X-axis and the direction of the Y-axis to the bucket 23 are all calculated as external vectors F43 and F44 applied to the pin 43 and pin 44 to compute the coordinates of the ZMP. Now, the position vectors at the pin 43 and pin 44 as acting points of external forces are assumed to be s43,s44. Further, an external force applied in the lateral direction (in the direction of the Y-axis) to the bucket 23 is assumed to be F46, and the position vector at an acting point 46 of the lateral external force is assumed to be s46.

<Stability Discrimination Method>

Before describing the computing unit 60*g* in detail, a description is now made about a stability discrimination method in the first embodiment.

<ZMP Stability Discrimination Method>

In the first embodiment, a ZMP (Zero Moment Point) is used to determine the stability conditions of the working machine 1. A ZMP stability discrimination criterion is based on the d'Alembert's principle. The concept of ZMP and ZMP stability discrimination criterion are described in Miomir Vukobratovic: "LEGGED LOCOMOTION ROBOTS" (translated into Japanese by Ichiro KATO: "HOKOU ROBOTTO To JINKOU NO ASHI (LEGGED LOCOMOTON ROBOTS AND ARTIFICIAL LEGS)" by Nikkan Kogyo Shimbun-sha).

From the working machine 1 onto the ground surface 30, a gravity, an inertia force, an external force and their moment act. According to the d'Alembert's principle, they are balanced with a ground reaction force and a ground reaction moment as counteraction from the ground surface 30 to the working machine 1.

When the working machine 1 is in stable contact with the ground surface 30, a point (ZMP) where moments in the directions of pitch axis and roll axis become zero, therefore, exists on one of sides of or inside a support polygon formed by connecting points of contact between the working machine 1 and the ground surface 30 such that no concave shape is allowed. Conversely speaking, when the ZMP exists in the support polygon and the force acting from the working machine 1 on the ground surface 30 is in a pressing direction against the ground surface 30, in other words, the ground reaction force is positive, the working machine 1 can be considered to be in stable contact with the ground.

Specifically speaking, the stability is higher as the ZMP is closer to the center of the polygon, and the working machine 1 can perform work without tipping when the ZMP is located inside the support polygon. When the ZMP exists on any one of the sides of the support polygon, the working machine 1 has a potential problem that it may start tipping. It is, therefore, possible to determine the stability by comparing the ZMP with the support polygon formed by the working machine 1 and the ground surface 30.

<ZMP Equation>

Based on the balance among moments produced by the gravity, inertia force and external force, a ZMP equation can be derived as follows:

[Equation 1]

$$\sum_i m_i(r_i - r_{zmp}) \times r_i'' - \sum_j M_j - \sum_k (s_k - r_{zmp}) \times F_k = 0 \quad (1)$$

where, $r_{zmp}$: ZMP position vector, $m_i$: mass at an $i^{th}$ mass point, $r_i$: position vector at the $i^{th}$ mass point, $r''_i$: acceleration vector (including gravitational acceleration) applied to the $i^{th}$ mass point, $M_j$: $j^{th}$ external moment, sk: position vector at the $k^{th}$ acting point of external force, Fk: $k^{th}$ external force vector It is to be noted that each vector is a three-dimensional vector having X-component, Y-component and Z-component.

The first term in the left side of the above equation (1) represents the sum of moments (radii: $r_i$-$r_{zmp}$) about the ZMP 70 (see FIG. 3), which are produced by acceleration components (which include gravitational accelerations) applied at the respective mass points $m_i$. The second term in the left side of the above equation (1) represents the sum of external moments $M_3$ acting on the working machine 1. The third term in the left side of the above equation (1) represents the sum of moments (radii: sk-$r_{zmp}$) about the ZMP 70, which are produced by external forces $F_k$ (the acting point of the $k^{th}$ external force vector $F_k$ is represented by sk).

The equation (1) describes that the sum of the moments (radii: $r_i$-$r_{zmp}$) about the ZMP 70, which are produced by the acceleration components (which include gravitational accelerations) applied at the respective mass points $m_i$, the sum of external moments $M_j$, and the sum of the moments (radii: sk-$r_{zmp}$) about the ZMP 70, which are produced by the external forces $F_k$ (the acting point of the $k^{th}$ external vector $F_k$ is represented by sk), are balancing.

The ZMP 70 on the ground surface 30 can be calculated by the ZMP equation expressed as equation (1).

When the object is at rest and only the gravity is acting, the ZMP equation can be expressed by:

[Equation 2]

$$\sum_i m_i(r_i - r_{zmp}) \times g = 0 \quad (2)$$

and therefore, the ZMP coincides with a projected point of the static center of gravity on the ground surface. The ZMP can, accordingly, be dealt with as the projected point of the center of gravity with a dynamic state and a static state being taken in consideration, and the use of the ZMP as an index makes it possible to commonly deal with both cases where an object is at rest and where the object undergoing motion.

<Computing Unit>

To compute ZMP coordinates and stability as described above, the computing unit 60*g* illustrated in FIG. 2 is primarily provided with function blocks of a linkage computing means 60*a*, ZMP computing means 60*b*, stability computing means 60*c*, blade ground-contact determination means 60*d*, jack-up determination means 60*e*, and lateral external force computing means 60*f*. The individual function blocks that make up the computing unit 60*g* can be realized by a software logic that the respective functions are incorporated in the program for driving the computing unit 60*g*.

About the functions of the respective function blocks, a description will hereinafter be made with reference to FIGS. 1 through 4.

<Linkage Computing Means>

Detection values of the posture sensor 3*b*, swing angle sensor 3*s*, boom angle sensor 40*a*, arm angle sensor 41*a*, bucket angle sensor 42*a*, undercarriage acceleration sensor 2*a*, upperstructure acceleration sensor 3*a*, boom acceleration sensor 10*a*, arm acceleration sensor 12*a* and pin force sensors 43*a*,44*a*, which are shown in FIG. 1 and FIG. 2 and are arranged at the various parts of the working machine 1, are fed to the linkage computing means 60*a*.

At the linkage computing means 60*a* in the computing unit 60*g*, kinematic calculations are sequentially performed by using a value of the posture sensor 3*b* shown in FIG. 1 and arranged on the upperstructure 3 and detection values of the swing angle sensor 3*s*, boom angle sensor 40*a*, arm angle sensor 41*a* and bucket angle sensor 42*a* shown in FIG. 1 and arranged at the various parts of the working machine 1. The position vectors r2,r3,r10,r12 at the respective mass points 2P, 3P, 10P, 12P shown in FIG. 3, the acceleration vectors r"2, r"3,r"10,r"12 at the respective mass points as calculated from the results of detection at the undercarriage acceleration sensor 2*a*, upperstructure acceleration sensor 3*a*, boom acceleration sensor 10*a* and arm acceleration sensor 12*a*, the position vectors s43,s44,s46 at the acting point 46 of lateral external force, and the respective external force vectors F43,F44,F46 acting on the pins 43,44 are then converted to values based on the machine reference coordinate system (O-XYZ). It is to be noted that as a method for the kinematic calculations, the method described, for example, in a non-patent document, YOSHIKAWA, Tsuneo: "Robotto Seigyo Kisoron (Fundamentals of Robot Control)", in *Japanese*, Corona Publishing Co., Ltd. (1988) can be used.

<ZMP Computing Means>

Figure 4A:
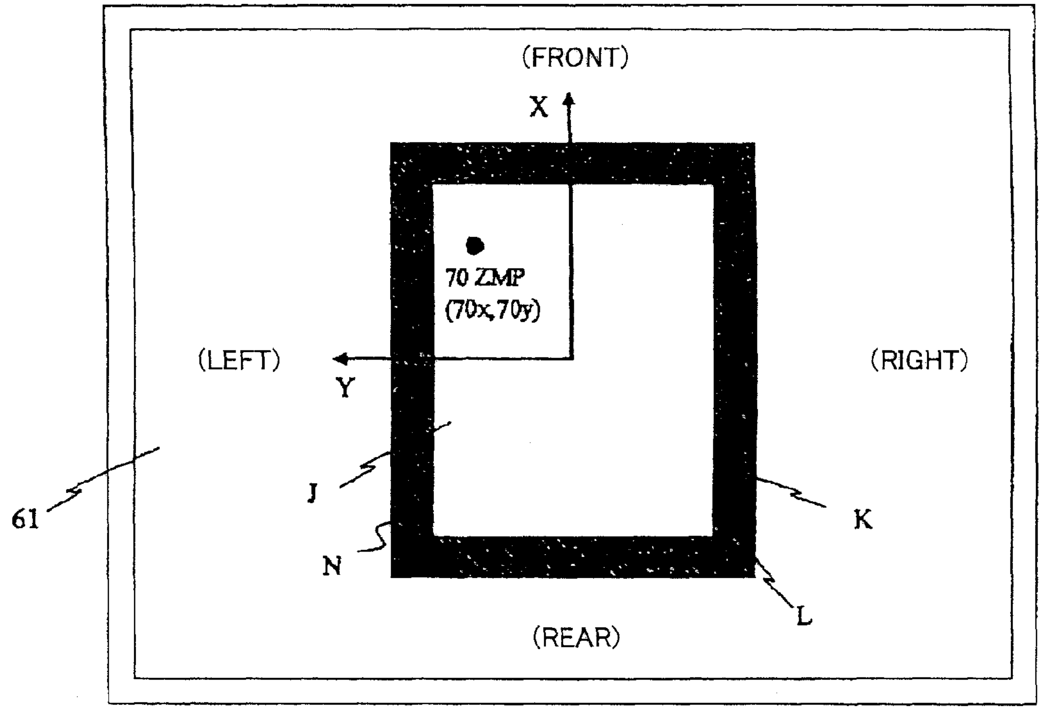
FIGS. 4(*a*) and 4(*b*) are diagrams illustrating examples of a support polygon.
Figure 4B:
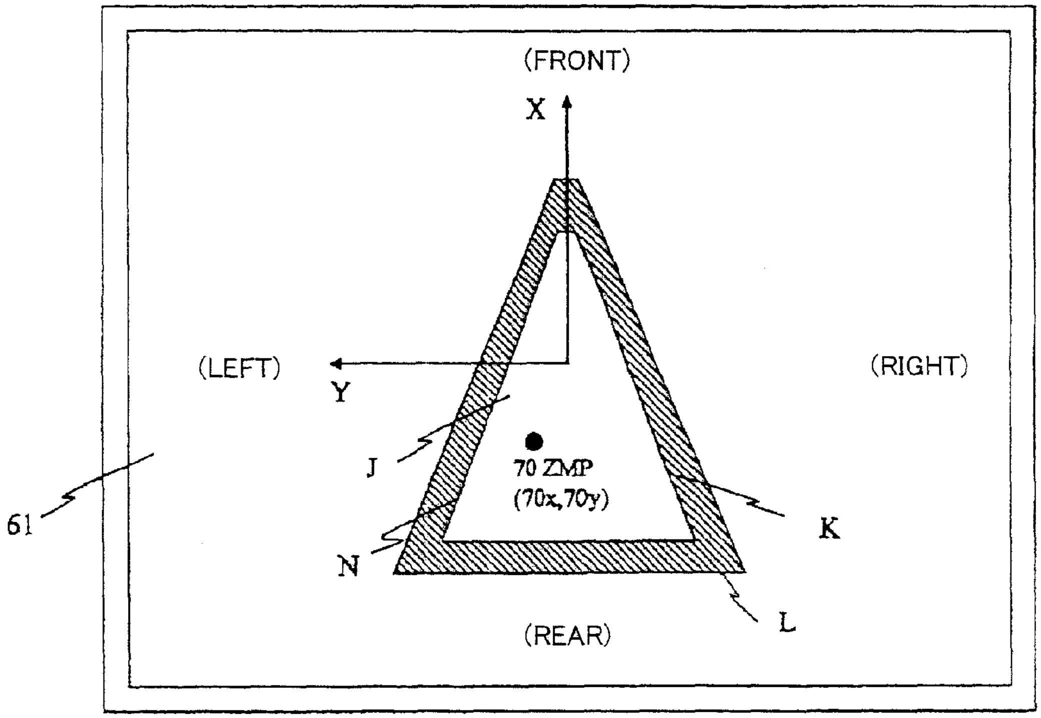

At the ZMP computing means 60*b* in the computing unit 60*g* as shown in FIG. 2, the coordinates of the ZMP 70 as illustrated in FIG. 4(*a*) or 4(*b*) are calculated by using the position vectors, acceleration vectors and external force vectors at the respective mass points, said vectors having been converted to the machine reference coordinate system.

Assuming that the z-axis coordinate of the ZMP is located on the ground surface 30 in the first embodiment because the origin O of the machine reference coordinate system is set at the point where the undercarriage 2 and the ground surface 30 are in contact to each other, $r_{zmpz}=0$. Further, no substantial external force or external force moment generally acts on parts other than the bucket 23 in the working machine 1. By hence ignoring effects of external forces or external force moments acting on the parts other than the bucket 23, the external moment M is deemed to be 0 (M=0). By solving the equation (1) under such conditions, the X-coordinate $r_{zmpx}$ of the ZMP 70 is calculated as follows:

[Equation 3]

$$r_{zmpx} = \frac{\sum_i m_i(r_{iz}r''_{ix} - r_{ix}r''_{iz}) - \sum_k (s_{kz}F_{kx} - s_{kx}F_{kz})}{\sum_i m_i r''_{iz} - \sum_k F_{kz}} \quad (3)$$

Likewise, the Y-coordinate $r_{zmpy}$ of the ZMP 70 is calculated as follows:

[Equation 4]

$$r_{zmpy} = \frac{\sum_i m_i(r_{iy}r''_{iz} - r_{iz}r''_{iy}) - \sum_k (s_{ky}F_{kz} - s_{kz}F_{ky})}{\sum_i m_i r''_{iz} - \sum_k F_{kz}} \quad (4)$$

In the equations (3) and (4), m is the mass at each mass point 2P, 3P, 10P or 12P shown in FIG. 3, and the masses m2, m3, m10, m12 at the respective mass points are substituted for m.

r" is an acceleration at each mass point, and the accelerations r"2, r"3, r"10, r"12 are substituted for r".

s indicates a position vector at each one of the pins 43,44 as the acting points of external forces and the acting point 46 of lateral external force on the bucket 23, and s43,s44,s46 are substituted for s.

F represents an external force vector applied to each one of the pins 43, 44 as the acting points of external forces and the acting point of lateral external force on the bucket 23, and F43,F44,F46 are substituted for F.

As has been described above, the ZMP computing means 60*b* can calculate the coordinates of the ZMP 70 by using the detection values of the respective sensors arranged at the various parts of the working machine 1.

<Stability Computing Means>

The stability computing means 60*c* next performs a discrimination of the stability of the working machine 1 on the basis of the coordinates of the ZMP 70 (X-coordinate: 70*x*, Y-coordinate: 70*y*) as calculated by the ZMP computing means 60*b*. When the ZMP 70 exists inside a support polygon L formed by ground contact points between the working machine 1 and the ground surface 30 as described above, the working machine 1 shown in FIG. 1 can perform work without tipping over.

Therefore, the stability computing means 60*c* in the first embodiment calculates the support polygon L formed by the working machine 1 and ground surface 30 as illustrated in FIG. 4(*a*) or 4(*b*), and with respect to the support polygon L, sets a normal region J where the possibility of tipping is sufficiently low and a tipping warning region N where the possibility of tipping is higher.

When the coordinates of the ZMP 70 are in the normal region J, the stability computing means 60*c* outputs information on the stability to the display 61. When the coordinates of the ZMP 70 are in the tipping warning region N, on the other hand, the stability computing means 60*c* outputs information on the stability and a tipping warning to the display 61 and warning device 63, respectively.

By producing a warning as described above when the ZMP 70 is in the tipping warning region N, the operator can become aware of the possibility of tipping before the ZMP 70 reaches any one of the sides of the support polygon L.

FIGS. 4(*a*) and 4(*b*) are diagrams, each of which illustrates the support polygon L and ZMP 70. FIG. 4(*a*) diagrammatically illustrates one example of the support polygon, in which the undercarriage is located upright on the ground surface. FIG. 4(*b*) diagrammatically illustrates another example of the support polygon, in which the undercarriage has been jacked up by the front working mechanism.

It is to be noted that FIGS. 4(*a*) and 4(*b*) each illustrate an image displayed on the display 61 (see FIG. 1) arranged in the operator's cab 4 (see FIG. 1) and the surrounding double lines indicate a frame of the display 61.

Figure 5:
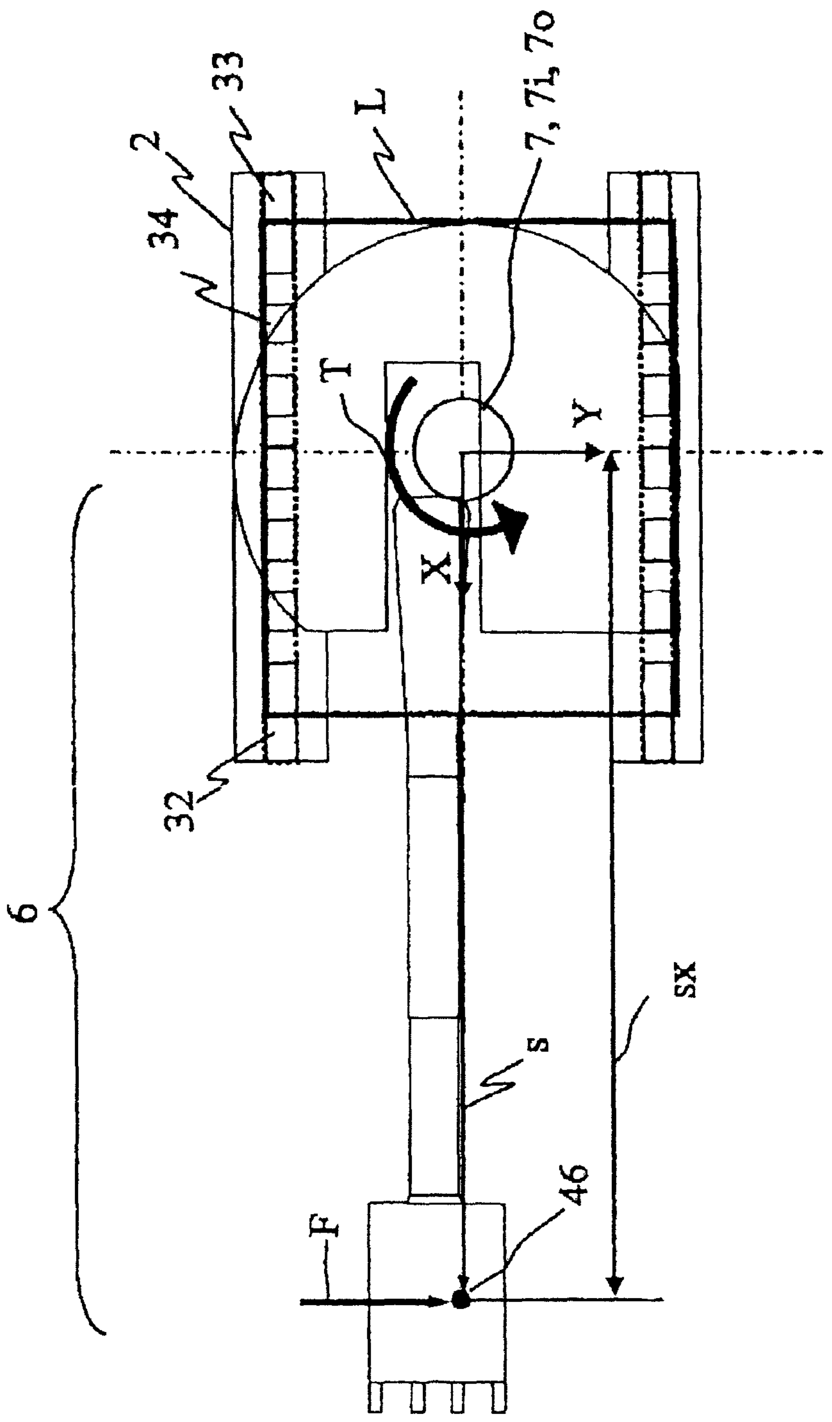
FIG. 5 is a schematic top plan view showing the computing model of the working machine.

When the working machine 1 is located upright on the ground surface 30 as illustrated in FIG. 4(*a*), the support polygon L is substantially the same as the planar shape of the undercarriage 2. When the planar shape of the undercarriage 2 is rectangular, the support polygon L, therefore, becomes rectangular as illustrated in FIG. 4(*a*). When the working machine 1 has crawlers as the undercarriage 2 as shown in FIG. 5, the support polygon L is in a quadrilateral shape having, as a front boundary, a line connecting central points of left and right sprockets 32, as a rear boundary, a line connecting central points of left and right idlers 33, and as left and right boundaries, right and left outer side edges of respective track links. It is to be noted that the front and rear boundaries can be the ground contact points of frontmost lower rollers 34 and the ground contact points of rearmost lower rollers 34, respectively.

When the undercarriage 2 is jacked up by the front working mechanism 6, on the other hand, the working machine 1 comes into contact with the ground surface 30 at a free end of the front working mechanism 6 and a rear part of the undercarriage 2 (when the front working mechanism 6 jacks up in front of the undercarriage 2) so that the support polygon L becomes such a polygon as illustrated in FIG. 4(*b*).

The calculation of the support polygon L is performed based on the state of ground contact of the working machine 1 with reference to the result of determination by the blade ground-contact determination means 60*d* or jack-up determination means 60*e*.

A boundary K between the normal region J and the tipping warning region N is set inside the support polygon L. Described specifically, the boundary K is set as a polygon contracted toward a central point at a ratio determined according to a safety factor, or as a polygon moved inward by a length determined according to the safety factor.

As this embodiment is configured to produce a warning when the ZMP 70 is in the tipping warning region N, the warning is produced earlier as the area of the tipping warning region N increases. The size of the tipping warning region N can, therefore, be determined in view of safety or the like required for the working machine 1. It is to be noted that the safety factor may be a desired value set beforehand (for example, 80%) or may be a value to be changed depending on the proficiency level of the operator who operates the working machine 1, work details, road surface, surrounding circumstances and the like. In this case, it may be contemplated to automatically set the safety factor from information given beforehand, output values of various sensors, or the like, or to allow an operator or work supervisor to set the safety factor as desired by using the user setting input device 55.

It is to be noted that the safety factor may be changed during work depending on the operating conditions of the working machine 1 or safety factors of different values may be used for the front, rear, left and right boundaries, respectively.

Figure 6A:
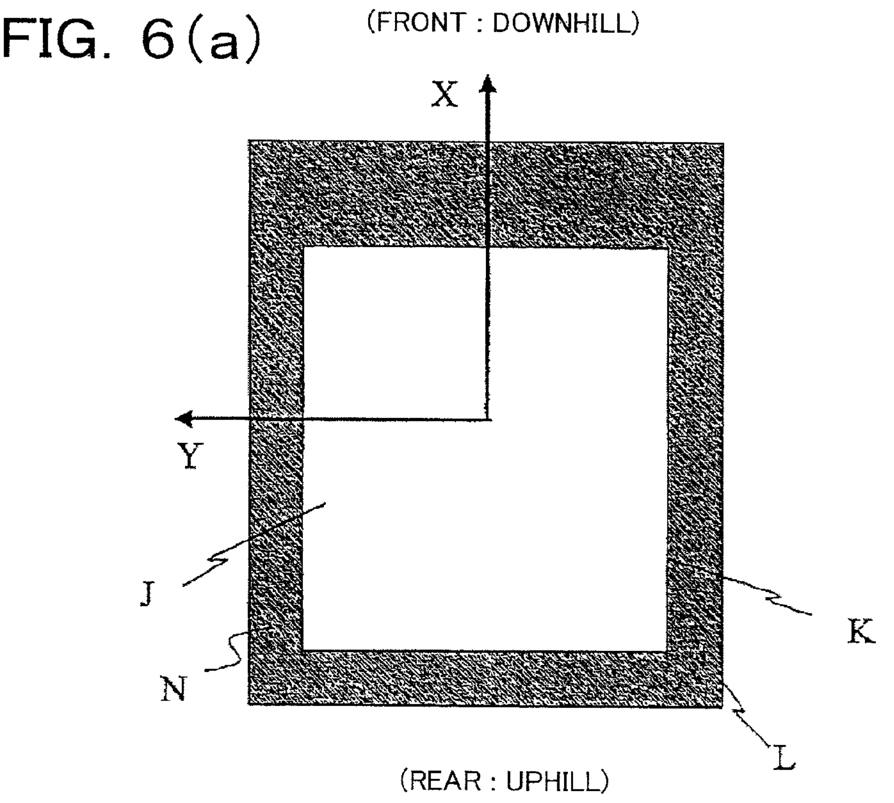
FIGS. 6(*a*) and 6(*b*) are diagrams illustrating examples of a setting method of a tipping warning region.
Figure 6B:
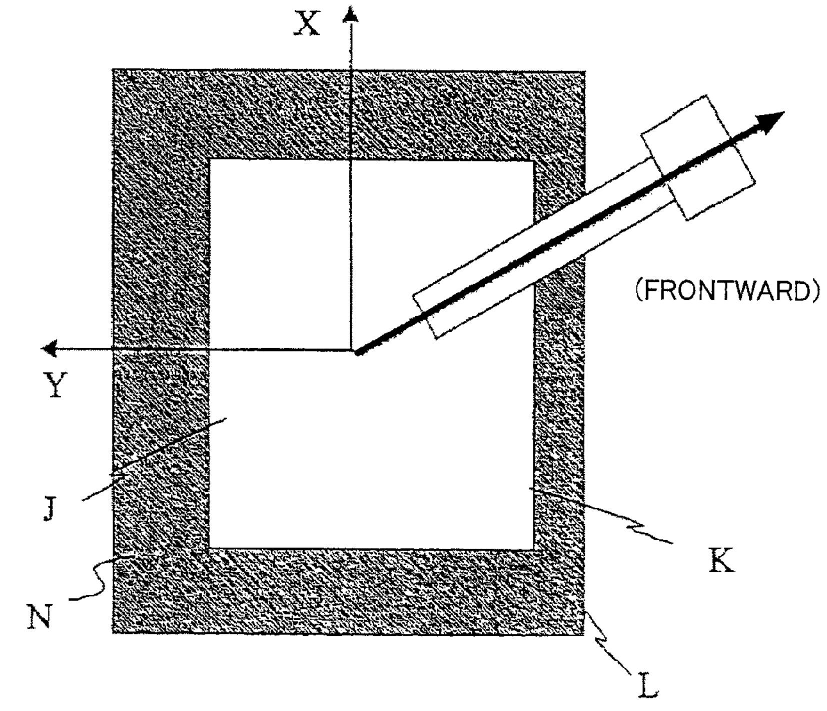

In work on a sloping ground, for example, the ZMP 70 is prone to move toward the downhill side on an inclined surface so that tipping tends to occur more easily toward the downhill side than the uphill side. The tipping warning region N is, therefore, set to become wider on the downhill side depending on the inclination as illustrated in FIG. 6(*a*). It may be contemplated to use, as the inclination, an input by the operator or a detection value of the posture sensor 3*b*.

Upon occurrence of tipping, tipping in a direction other than the direction in which the front working mechanism 6 exists tends to result in a more serious accident compared with tipping in the direction toward the front working mechanism 6. It is, therefore, desired to set the tipping warning region N such that in view of the direction of the front working mechanism 6, it becomes wider in directions other than the direction of the front working mechanism 6 as illustrated in FIG. 6 (*b*). It is to be noted that the direction of the front working mechanism 6 relative to the support polygon L can be detected by the swing angle sensor 3*s*.

Figure 7:
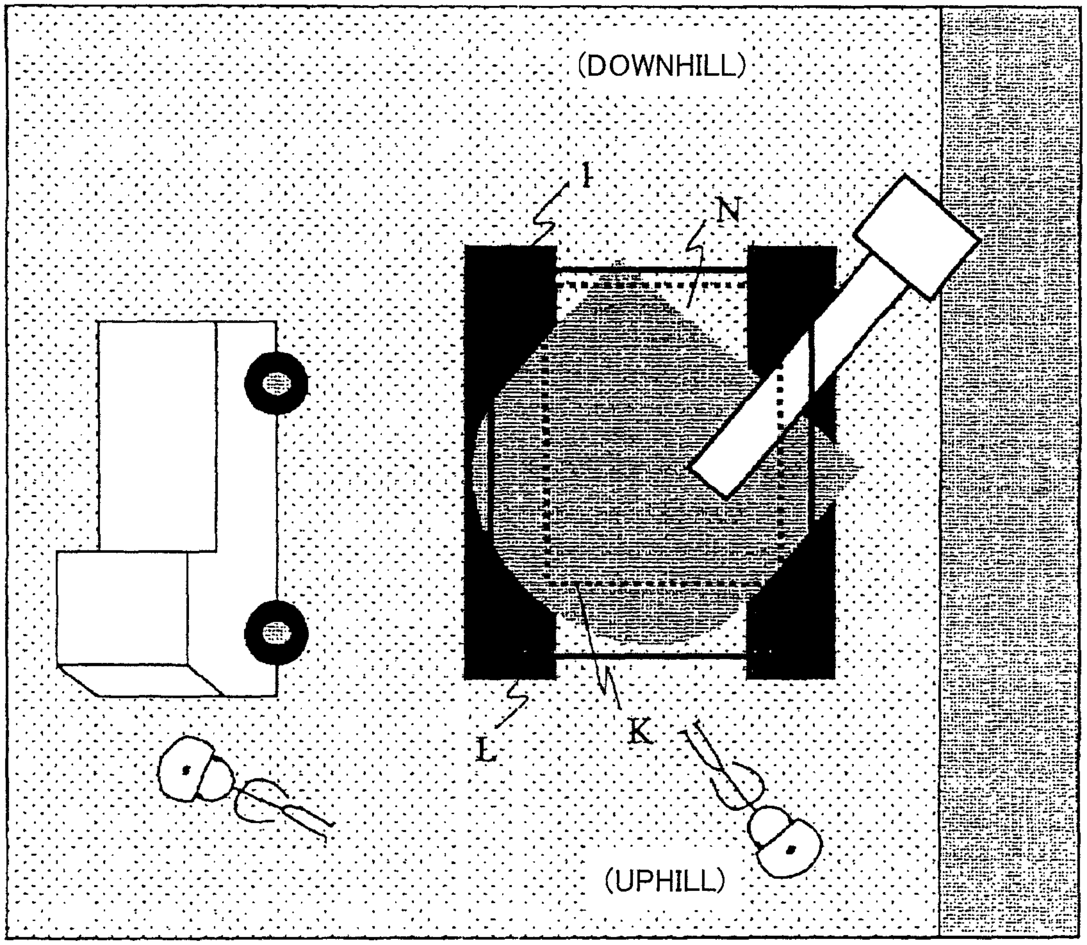
FIG. 7 is a diagram illustrating a further example of the setting method of the tipping warning region.

An example of the setting of the tipping warning region N, which takes into consideration the operating conditions and surrounding circumstances, is illustrated in FIG. 7. The example of FIG. 7 assumes a situation, in which the working machine 1 is parking headed uphill on a gently sloping ground, there are workers at the rear and left rear of the working machine 1, a truck exists on the left side, and a ditch exists on the right side of the working machine 1. In view of the severity of effects if tipping would occur, the tipping warning region N is set broader in the direction where the ditch exists, and further, the tipping warning region N is set still broader in the directions where the workers and truck exist, both compared with the front side where no hazard exists. In addition, the tipping warning region N is also set to become broader on the downhill side (rear side) where tipping tends to occur. As a method for setting the tipping warning region N as described above, it is contemplated to manually change the setting as needed by the operator or work supervisor or to use a GPS, map information, a CAD drawing of the work, or the like. The use of the above-described information makes it possible to automatically discriminate a direction where tipping tends to occur or a direction where a damage is large if tipped and to automatically change the boundary K between the normal region J and the tipping warning region N such that the tipping warning region N becomes broader in such directions.

By setting the safety factor at an appropriate value as described above, safe work can be performed without a reduction in efficiency.

<Addition of Work Details Discrimination Means>

As a setting method of the tipping warning region N, it may be contemplated to recognize the details of ongoing work and to change the size and/or shape of the tipping warning region N depending on the work details.

Tipping warning regions N, which conform to characteristic operation patterns in plural kinds of work such as suspending work, digging work, demolishing work and traveling and also to their respective work details, are set and stored beforehand. A lever stroke sensor 51 is arranged to detect input command quantities for the respective drive actuators 11,13, 15, and from the posture of the front working mechanism and an external force on the bucket as calculated at the ZMP computing means and a record of detection values of the lever stroke sensor 51, the closest one is chosen from the operation patterns set beforehand and the corresponding tipping warning region N is outputted. By performing the discrimination of work details as described above, a tipping warning region suited for each work can be set so that the safety can be improved while maintaining high the efficiency of the work.

<Automated Change to the Size of Tipping Warning Region: Momenta>

As an alternative, the safety factor may be changed depending on the intensity of motion of the working machine 1. While the working machine 1 is undergoing motion, the effect of the moment term under inertia force in the ZMP equation represented by the equation (1) becomes large, and the displacement of the ZMP 70 increases. In other words, when the working machine 1 is undergoing some motion, the ZMP 70 is easier to reach the support polygon L and the possibility of tipping is higher. It can, therefore, be configured such that by changing the size of the tipping warning zone N in conformity to the operating conditions of the working machine 1, a tipping warning can be promptly outputted when the working machine 1 is intensely moving.

At this time, the sum of momenta at respective mass points are used as an index for evaluating the intensity of the operating conditions of the working machine 1. Described specifically, this sum is the total of the absolute values of products of the masses m2, m3, m10, m12 at the respective mass points 2P, 3P, 10P, 12P set as shown in FIG. 3 and the velocities r'2, r'3, r'10, r'12 at the respective mass points as calculated from the integrals of values of the respective acceleration sensors (undercarriage acceleration sensor 2*a*, upperstructure acceleration sensor 3*a*, boom acceleration sensor 10*a*, arm acceleration sensor 12*a*) shown in FIG. 1 or the derivatives of values of the respective angle sensors shown in FIG. 1, and can be expressed by the following equation:

[Equation 5]

$$\sum_i |m_i \times r_i'| \tag{5}$$

From the magnitude of a value of the equation (5), the size of the tipping warning region N is then determined. Described more specifically, when the sum of momenta as expressed by the equation (5) is 0, the boundary K between the normal region J and the tipping warning region K is set at a largest position, while it is set at a smallest position when the sum of the momenta is largest. In other words, the normal region J becomes largest when the sum of momenta is 0 and, when the sum of momenta is largest, the tipping warning region N becomes large and the normal region J becomes small.

It is to be noted that the maximum value of each momentum is calculated from the corresponding cylinder speed governed by the performance of the working machine 1. On the other hand, the largest position of the boundary K is assumed to be a position obtained by moving the support polygon L inward by an amount equivalent to a safety allowance set in view of an accuracy of measurement and the reaction lag of the operator. Further, the smallest position of the boundary K is assumed to be a position obtained by moving the support polygon L inward such that sufficient safety is assured even when the working machine 1 is moving at a maximum speed.

Between the largest position and smallest position of the boundary K, an interpolation is made with straight lines such that the boundary K is set inward little by little as the sum of momenta of the working machine increases. Curves formed of combinations of parabolas and circular arcs may, however, be used for the interpolation between the largest position and smallest position of the boundary K.

<Automated Change to the Size of Tipping Warning Region: Kinetic Energy>

As another index for evaluating the intensity of such operating conditions of the working machine 1 as needing to change the tipping warning region N, the sum of kinetic energies at respective mass points may be used. Described specifically, this sum is the total of the products of the masses m2, m3, m10, m12 and the squares of velocities r'2,r'3,r'10, r'12 at the respective mass points 2P,3P,10P,12P shown in FIG. 3, and can be expressed by the following equation:

[Equation 6]

$$\sum_i (m_i \times r_i'^2) \tag{6}$$

accordingly.

The determination of stability, which uses the ZMP 70, in the first embodiment can be performed by assignment operation on the equation (3) or (4) and a comparison between the results of the assignment operation and a predetermined region. Therefore, the setting of a complex model is not needed, and in any operation, the computation of stability is feasible by performing a similar computation. It is, accordingly, possible to bring about an excellent effect that moment-by-moment computation and determination of stability are feasible irrespective of the type of operation.

<Lateral External Force Computing Means>

At the lateral external force computing means 60*f*, the external force F46 applied in the Y-axis to the bucket 23 (see FIG. 5) is calculated. The acting point of an external force in the direction of the Y-axis is assumed to be the acting point 46 of lateral external force. As it is difficult to directly measure the external force vector F46 applied to this acting point 46 of lateral external force, the external force vector F46 is calculated at the lateral external force computing means 60*f* by using pressure values of a hydraulic pressure, which is driving the swing motor 7, as detected by the swing motor pressure sensors 7*i* and 7*o* arranged at the swing motor 7. At this time, the lateral external force computing means 60*f* uses such a model as shown in FIG. 5. FIG. 5 is a top plan view showing modeling of the upperstructure in the first embodiment.

First, a swing torque Tz3 applied to the upperstructure 3 is calculated from a difference in hydraulic pressure between a suction-side hydraulic pressure detected by the swing motor pressure sensor 7*i* and a delivery-side hydraulic pressure detected by the swing motor pressure sensor 7*o*, said pressure sensors 7*i* and 7*o* being arranged at the swing motor 7.

By dividing the swing torque Tz3 of the upperstructure 3 with an X-direction component sx46 of the position vector s46 at the acting point 46 of lateral external force as calculated by the linkage computing means 60*a*, a Y-direction component Fy46 (=Tz3/sx46) of the lateral external force applied to the acting point 46 of lateral external force is then calculated.

Because the external force produced in the lateral direction (the Y-direction in FIG. 5) by rotation of the upperstructure 3 is dealt with here, the lateral external force vector F46 has only a component in the Y-direction, F46=(0,Fy46,0), when the swing angle detected by the swing angle sensor 3*s* is 0. When the swing angle is not 0, on the other hand, the swing angle is used to convert Fy46 to a value based on the machine reference coordinate system (O-XYZ).

The lateral external force vector F46 calculated as described above acts on the acting point 46 of external force on the bucket 23 as shown in FIG. 3, whereby a moment is produced.

<Blade Ground-Contact Determination Means>

Figure 8:
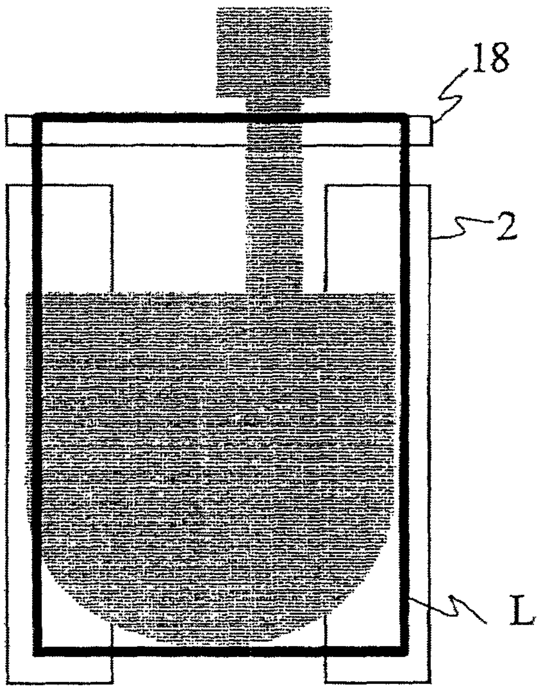
FIG. 8 is a diagram illustrating one example of a support polygon in a state that a blade is in contact with the ground.
Figure 9A:
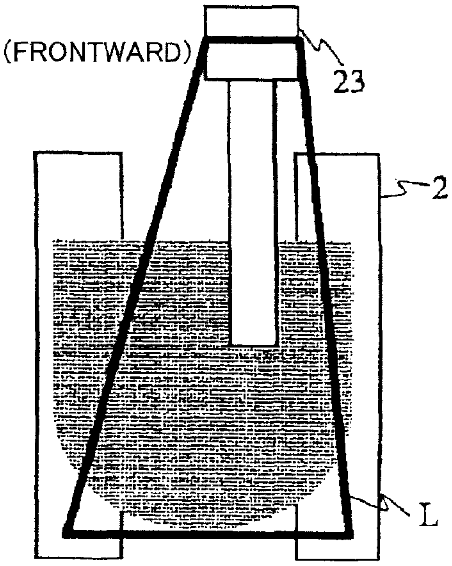
FIGS. 9(*a*) through 9(*d*) are diagrams illustrating examples of a support polygon in a jacked-up state.
Figure 9B:
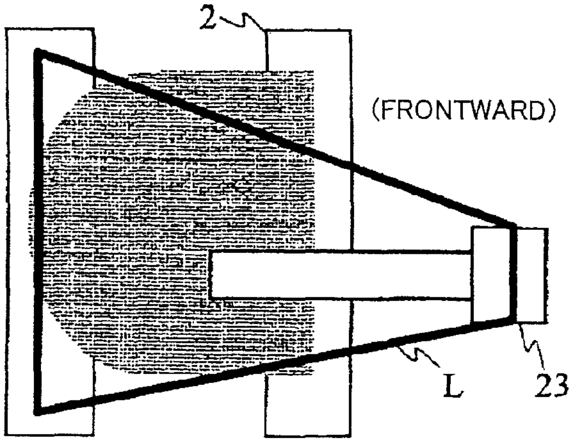
Figure 9C:
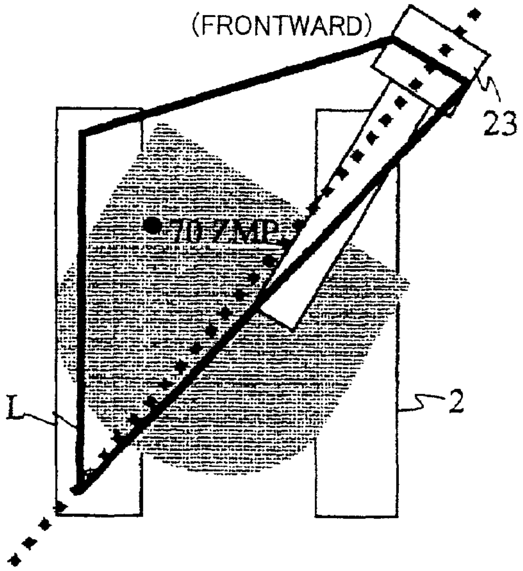
Figure 9D:
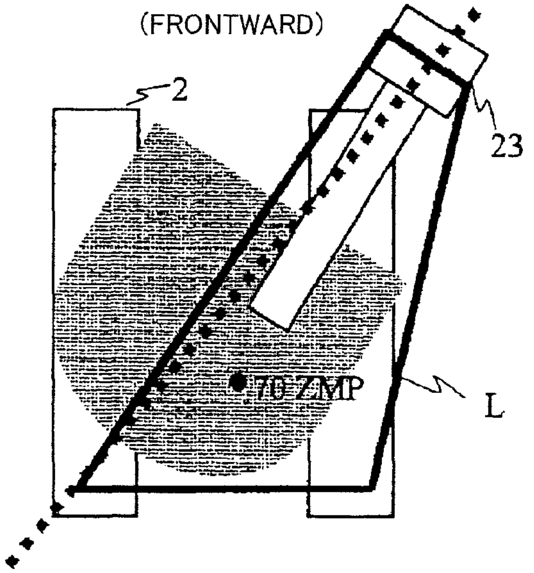

The blade ground-contact determination means 60*d* performs a determination as to whether or not the blade 18 is in contact with the ground surface 30. As shown in FIG. 1, the undercarriage 2 of the working machine 1 according to the first embodiment has the blade 18, and depending on the state of ground contact of the blade 18, the shape of the support polygon L changes. Described more specifically, when the blade 18 is in contact with the ground, the support polygon L takes a shape including a bottom part of the blade as shown in FIG. 8 so that the support polygon L is changed in shape to become larger. To determine the stability more accurately, it is, therefore, necessary to change the shape of the support polygon L to be used in the setting of the tipping warning region N at the stability computing means 60*b*.

The blade ground-contact determination means 60*d*, therefore, determines the state of ground contact of the blade 18 by using values Pb1, Pb2 of the blade cylinder pressure sensors 19*i*, 19*o* which measure the suction-side pressure and delivery-side pressure of the hydraulic pressure that is driving the blade cylinder 19. A threshold value Pb3 is set such that it is greater than a pressure required to drive the blade 18 under unloaded conditions but is smaller than a pressure required to jack up the working machine 1. When the difference between Pb1 and Pb2, Pb1-Pb2, is greater than the threshold value Pb3, the blade 18 is determined to be in contact with the ground surface 30 and a signal is fed to the stability computing means 60*c*.

At the stability computing means 60*c*, the signal from the blade ground-contact determination means 60*d* is received to change the shape of the support polygon L such that it becomes larger as illustrated in FIG. 8.

<Jack-Up Determination Means>

At the jack-up determination means 60*e*, a determination is made as to the existence or non-existence of a jacked-up state on the basis of detection values of the posture sensor 3*b* and swing angle sensor 3*s* for the upperstructure 3 and detection values of the pin force sensors 43*a*,44*a* arranged in the pins 43,44.

In a jacked-up state, which the bucket 23 has been pressed against the ground surface 30 to lift up a part of the undercarriage 2 in FIG. 1, the ground contact points between the working machine 1 and the ground surface 30 have changed so that the shape of the support polygon L changes. Described specifically, the support polygon L changes from the rectangular shape illustrated in FIG. 4(*a*) to a polygonal shape that, as shown in FIG. 4(*b*), is formed by two end points on a side, where the undercarriage 2 is in contact with the ground, and a ground contact point of the bucket 23. Because the shape of the support polygon L discontinuously changes as described, there is a possibility of resulting in tipping in a jacked-upstate even when the ZMP 70 exists in such a rectangular range as illustrated in FIG. 4(*a*). To accurately determine the stability, it is, therefore, necessary to detect a jacked-up state and to change the support polygon L to be used in the setting of the tipping warning region N at the stability computing means 60*c*.

When the value of the posture sensor 3*b* changes in a direction that the working machine 1 is lifted up on the side of the front working mechanism 6 and the force acting on the bucket 23 as calculated by the pin force sensors 43*a*, 44*a* is in a pressing direction against the ground surface 30, the jack-up determination means 60*e* determines a jacked-up state and sends a signal to the stability computing means 60*c*. It is to be noted that in a jack-up operation, which part of the undercarriage 2 is lifted up differs depending on the ground contact position of the bucket 23.

FIGS. 9(*a*) through 9(*d*) are diagrams illustrating relationships between directions of the front working mechanism 6 and support polygons L. When the bucket 23 comes into contact with the ground in front of the undercarriage 2, the front of the undercarriage 2 is lifted up so that the support polygon L takes a polygonal shape formed by the rear end points of the undercarriage 2 and the ground contact point of the bucket 23. When the bucket 23 likewise comes into contact with the ground in rear of the undercarriage 2, the rear of the undercarriage 2 is lifted up so that the support polygon L takes a polygonal shape formed by the front endpoints of the undercarriage 2 and the ground contact point of the bucket 23. When the bucket 23 comes into contact with the ground on the right side or left side of the undercarriage, the right side or left side of the undercarriage 2 is lifted up so that the support polygon L takes a polygonal shape formed by the end points of the left side or right side of the undercarriage 2 and the ground contact point of the bucket 23.

On the other hand, when the bucket 23 comes into contact with the ground in a direction oblique to the undercarriage 2 (in a region in front or rear of the undercarriage 2 and on its left or right side), which part of the undercarriage 2 is lifted up is determined depending on the position of the ZMP 70 when jacked up. A case, in which the bucket 23 comes into contact with the ground in right front of the undercarriage 23, is now taken as an example. When the ZMP 70 exists on a front left (upper) side relative to a line segment connecting the farthermost end point (the left rear endpoint of the undercarriage 2) from the central point of the ground contact point of the bucket 23 (the central bucket ground-contact point) out of the end points of the undercarriage 2 and the central bucket ground-contact point as illustrated in FIGS. 9(*c*) and 9(*d*), the left front end point comes into contact with the ground so that the right side of the undercarriage 2 is lifted up. Therefore, the support polygon L takes a polygonal shape formed by the left end points of the undercarriage 2 and the ground contact point of the bucket 23. When the ZMP 70 exists on a right rear (lower) side relative to the line segment connecting the farthermost end point (the left rear end point of the undercarriage 2) from the ground contact point of the bucket 23 out of the end points of the undercarriage 2 and the ground contact point of the bucket 23, the right rear endpoint comes into contact with the ground so that the front side of the undercarriage 2 is lifted up. Therefore, the support polygon L takes a polygonal shape formed by the front end points of the undercarriage 2 and the ground contact point of the bucket 23.

At the jack-up determination means 60*e*, another determination is made, in addition to the determination of a jacked-up state, as to which part of the undercarriage 2 is lifted up and which part of the undercarriage 2 comes into contact with the ground when the jacked-up state is determined, the shape of the support polygon L is calculated, and a signal is fed to the stability computing means 60*c*.

Using detection values of the swing angle sensor 3*s*, boom angle sensor 40*a*, arm angle sensor 41*a* and bucket angle sensor 42*a*, kinematic calculations are sequentially performed to calculate the ground contact point of the bucket 23. From the calculated ground contact point of the bucket, the central bucket ground-contact point is calculated, and among the end points of the undercarriage 2, the endpoint farthermost from the central bucket ground-contact point will be referred to as "the first ground contact end point". Next, a line segment connecting the first ground contact end point and the central bucket ground-contact point and the ZMP 70 are compared with each other, and of the two endpoints located adjacent to the first ground contact end point, the end point on the side where the ZMP 70 exists will be referred to as "the second ground contact end point". A polygonal shape formed by connecting the first and second, ground contact end points and the ground contact point of the bucket 23 will be used as the support polygon L.

As another method for deriving the ground contact endpoints of the undercarriage 2, it may be configured to calculate a tilt of the undercarriage 2 by using detection values of the posture sensor 3*b* and swing angle sensor 3*s* and to select, as the ground contact points, two downhill-side end points out of the end points of the undercarriage 2.

At the stability computing means 60*c*, the signal is received from the jack-up determination means 60*e* to change the shape of the support polygon L.

<Display>

As also shown in FIG. 1, the working machine 1 according to the first embodiment is provided with the display 61 and warning device 63.

The display (display means) 61 is a device comprised of a cathode ray tube, liquid crystal panel or the like, is arranged in the operator's cab (see FIG. 1), and displays the support polygon L, tipping warning region N, ZMP coordinates (see FIG. 4) and the like, all of which have been computed by the controller 60. The display 61 may be configured to display a sign of a tipping warning.

By displaying the stability and tipping warning on the display 61 arranged in the operator's cab 4 as described above, the operator is always made aware of any possibility of tipping so that work of high safety can be performed.

The display 61 may be configured to also serve as the user setting input device 55 through which the operator can perform the setting of a tipping warning region and a warning method. In this case, the display 61 should be provided with an input means such as a touch panel and should perform displaying a setting input icon.

<Warning Device>

In the working machine 1 according to the first embodiment, the warning device (warning means) 63 is also arranged in the operator's cab 4. The warning device 63 is a device, for example, a buzzer or the like, and can produce a warning sound. When the ZMP 70 is found to exist in the tipping warning region N (see FIG. 4) as a result of a computation at the controller 60, the warning device produces a warning such as a warning sound by a control from the stability computing means 60*c* (see FIG. 2).

By making the operator become aware of any possibility of tipping with a warning produced by the warning device 63 arranged in the operator's cab 4 as described above, work of high stability can be performed.

<Modeling of Operator and Fuel>

In the above-described embodiment, it was configured to set the masses of the operator and fuel such as gas oil at standard constant values and to include them in the mass of the upperstructure 3. When a high-accuracy determination of stability is needed or when the difference in body mass of an operator and/or the change in mass of a residual quantity of fuel accounts for a relatively large percentage of the mass of the machine itself, it may be configured to change the mass and center of gravity of the upperstructure 3 according to the mass of the operator and/or the mass of fuel. Concerning the mass of the operator, it may be configured to automatically measure the mass by arranging a weighing scale or the like in the operator's cab or to allow the operator to input the mass through the user setting input device 55. With respect to the mass of the fuel, on the other hand, it may be contemplated to use, for example, a method that calculates the mass by multiplying a residual quantity of the fuel, which can be detected by a fuel gauge, with the specific gravity of the fuel.

<Remote Control>

In the above embodiment, the description was made under the assumption that the operator sits in the operator's cab 4 arranged on the working machine 1 and performs the control of the working machine 1. On the other hand, there is a case in which the control of the working machine 1 is performed by a remote control that makes use of wireless transmission. At the time of a remote control, it is difficult to accurately grasp the posture of the working machine, the inclination of a road surface and the like compared with the time that the operator sits in the operator's cab. Further, it is difficult even for a skilled operator to get a sensory grasp of the safety of the working machine. The display of stability information and the warning for the operator can, therefore, bring about still better advantageous effects at the time of a remote control.

In the remote-controlled working machine, the control lever is generally arranged at a control site for the operator other than on the working machine 1. The display device and warning device can also be arranged at the site where the operator performs controls.

As an application mode of the display device, it is possible to contemplate a case in which a work supervisor performs the confirmation of conditions of the working machine 1 from a remote place. In such a case, a display for the work supervisor can be arranged at a site other than on the working machine 1 in addition to the display for the operator, and by performing a data transfer through wireless transmission, the conditions of the working machine 1 can be displayed. The showing on the display for the supervisor may be the same as that for the operator, or other information may be additionally displayed.

The above-described first embodiment makes it possible, no matter whichever operation the working machine 1 is performing, to calculate moment by moment the dynamic stability including an inertia force of the front working mechanism and an external force and to provide the operator with information on the safety without delay. As a result, it is possible to reduce the possibility of tipping of the working machine by an unreasonably aggressive operation and to provide a working machine of high safety. By detecting a motion, such as a contact of the blade with the ground or a jack-up, that the state of contact between the working machine and the ground surface changes and by changing the tipping warning region, the safety can be accurately determined to enhance the stability even when the state of contact with the ground changes.

<Modification Examples of Sensor Configuration>

As to the configurations of sensors in the first embodiment, modifiable examples will hereinafter be described (see FIGS. 1 through 5).

<Swing Angle Sensor>

For measuring a swing angle, there are two methods, one being to measure an absolute azimuth relative to the ground surface 30, and the other to measure a relative angle to the undercarriage 2. Although a relative angle is detected by the swing angle sensor 3*s* in the first embodiment, it may be configured to detect absolute azimuths of the upperstructure 3 and undercarriage 2 by using geomagnetic sensors, a GPS or the like and to calculate a relative swing angle based on a difference between the absolute azimuths. The adoption of such a configuration makes it possible to practice the present invention even when it is difficult to arrange the swing angle sensor 3*s*.

<Angle Sensors>

In the first embodiment, the boom angle sensor 40*a* and arm angle sensor 41*a* are used for the detection of a posture of the front working mechanism 6. It may, however, be configured to use a tilt angle sensor instead of these angle sensors. The adoption of such a configuration makes it possible to practice the present invention even when it is difficult to arrange angle sensors at the fulcrums 40 and 41.

<Omission of Acceleration Sensors>

In the first embodiment, the upperstructure acceleration sensor 3*a*, boom acceleration sensor 10*a* and arm acceleration sensor 12*a* are used to calculate accelerations at the respective mass points 3P,10P,12P shown in FIG. 3. However, these accelerations may be determined by perform second order differential on values of the angle sensors without arranging these acceleration sensors. When desired to determine, for example, a rotational acceleration of the upperstructure 3, it can be determined by performing second order differential on a rotational angle of the upperstructure as detected by the swing angle sensor 3*s*. When desired to adopt such a configuration, it is necessary to keep in mind a measurement noise by the second order differential. Nonetheless, the working machine can be constructed with a more economical and simpler configuration because the number of sensors to be arranged can be reduced and signals to be fed to the controller 60 become fewer.

<Arrangement Place of Posture Sensor>

In the first embodiment, the posture sensor 3*b* is arranged on the upperstructure 3. It may, however, be possible to adopt a configuration that the posture sensor 3 is arranged on the undercarriage 2. The adoption of such a configuration makes it possible to calculate an inclination of the machine reference coordinate system relative to the world coordinate system without using the detection value of the swing angle sensor 3*s*.

<Omission of Posture Sensor>

In the first embodiment, the posture sensor 3*b* on the upperstructure 3 is used for the detection of an inclination of the road surface. It may, however, be possible to adopt a configuration without the posture sensor 3*b* when an acceleration sensor capable of measuring a direct current component (gravity) is used as the undercarriage acceleration sensor 2*a*. In such a case, the working machine can be constructed with a more economical and simpler configuration because the number of sensors to be arranged decreases and signals to be fed to the controller 60 become fewer.

<Omission of Posture Sensor>

When the site where the working machine 1 is to be used is limited to a horizontal site, for example, as in scrap handling work at a fixed yard, changes in the position vectors r at the respective mass points and the position vectors s at the acting points of external forces by a tilt of the working machine 1 are sufficiently small.

In such a case as described above, it may, therefore, be possible to adopt a configuration without the posture sensor 3*b* for the upperstructure 3. The working machine can be constructed with a more economical and simpler configuration because the number of sensors to be arranged is reduced and signals to be fed to the controller 60 become fewer.

The ZMP 70 can now be calculated under the assumption that the machine reference coordinate system is always horizontal relative to the world coordinate system.

<Omission of Undercarriage Sensors>

<Omission of Undercarriage Acceleration Sensor>

Concerning an acceleration of the undercarriage 2, on the other hand, it may be configured to estimate the acceleration from an acceleration of the upperstructure 3 and a swing angle detected by the swing angle sensor 3*s*, and therefore, to omit the undercarriage acceleration sensor 2*a* which would otherwise be adapted to detect the acceleration of the undercarriage 2.

It may also be possible to adopt a configuration without the undercarriage acceleration sensor 2*a* for the undercarriage 2 when the safety of the working machine 1 during traveling is sufficiently secured and no discrimination of stability is needed with an inertia force by an acceleration being taken into consideration.

The ZMP 70 can now be calculated under the assumption that the acceleration r"2 of the undercarriage 2 has only a gravity component.

<Omission of Blade Cylinder Pressure Sensors>

It may also be configured to input information on contact or non-contact of the blade through the user setting input device 55 instead of its determination at the blade ground-contact determination means 60*d* and to omit the blade cylinder pressure sensors 19*i*,19*o*.

As the upperstructure 3 can rotate over 360 degrees or more relative to the undercarriage 2 in the working machine 1, the use of a slip ring, wireless transmission or the like is needed to transmit a detection value of a sensor to the controller 60 when the sensor is arranged on the undercarriage 2. When a configuration is adopted without the undercarriage acceleration sensor 2*a* and blade cylinder pressure sensors 19*i*,19*o* as described above, it is no longer needed to transmit information by using a slip ring, wireless transmission or the like, thereby making it possible to adopt a simpler configuration of higher reliability. As the number of sensors to be arranged is reduced and signals to be transmitted to the controller 60 become fewer, the working machine can be constructed with a more economical and simpler configuration.

<Omission of Upperstructure Acceleration Sensor>

When the working machine 1 performs no swing operation, the moment which is produced by an inertia force of the upperstructure 3 is very small compared with the moment which is produced by an inertia force of the front working mechanism 6.

It may, therefore, be possible to adopt a configuration without the upperstructure acceleration sensor 3*a* for the upperstructure 3 when the working machine 1 performs practically no swing operation by the upperstructure 3. In such a case, the number of sensors to be arranged is reduced and signals to be transmitted to the controller 60 become fewer, so that the configuration becomes more economical and simpler.

The ZMP 70 can now be calculated under the assumption that the acceleration r"3 of the upperstructure 3 has only a gravity component.

<Omission of Swing Pressure Sensors>

When the working machine 1 (see FIG. 1) does not perform work by using its rotating power, no substantial external force is applied in the lateral direction to the bucket 23. There is, accordingly, no risk that the stability would be deteriorated by an external force in lateral direction to the bucket 23 during work. In such a case, it may be possible to adopt a configuration without the swing motor pressure sensors 7*i* and 7*o* which would otherwise be adopted to detect a suction-side pressure and delivery-side pressure of the swing motor 7 for the measurement of a lateral external force. In such a case, the number of sensors to be arranged is reduced and signals to be transmitted to the controller 60 become fewer, so that the configuration becomes more economical and simpler. It is also possible to reduce the volume of computation.

<Measuring Method of External Force>

In the forgoing, the description has been made about the embodiment in which the pin force sensors 43*a*,44*a* are arranged for the detection of an external force applied to the bucket. As another detection method, there is a method that provides the boom cylinder with pressure sensors 11*a*, 11*b*. According to this method, a moment MI, which includes an external force on the bucket and the own weight of the front working mechanism, is calculated from detection values of the pressure sensors 11*a*,11*b* arranged at the boom cylinder, and a own weight moment Moc of the front working mechanism is calculated from detection values of the respective angle sensors for the boom, arm and bucket and the respective center-of-gravity parameters of the boom, arm and bucket. The external force on the bucket is then calculated from the difference between the moments MI and Moc and the distance from the center of rotation to the bucket.

<Omission of External Force Detection Means>

When the working machine 1 is provided, for example, with an unillustrated cutter as a working attachment and primarily performs only cutting work, no substantial external force is applied to the front working mechanism 6 during the work because the cutting work is performed using the internal force of the cutter. In a case like this that there is no risk of a deterioration in stability by an external force during work, the configuration may be adopted without the pin force sensors 43*a*, 44*a* that would otherwise be needed to detect an external force applied to the pins 43,44 (see FIG. 1).

In this case, an acceleration sensor is also arranged on the working attachment, and based on a gravity applied to working machine 1 and an inertia force applied to the working attachment, a ZMP computation can be performed.

By adopting the configuration without the pin force sensors 43*a*, 44*a* as described above, the configuration can be provided more economically.

Second Embodiment

<Swing Post Type>

Figure 10:
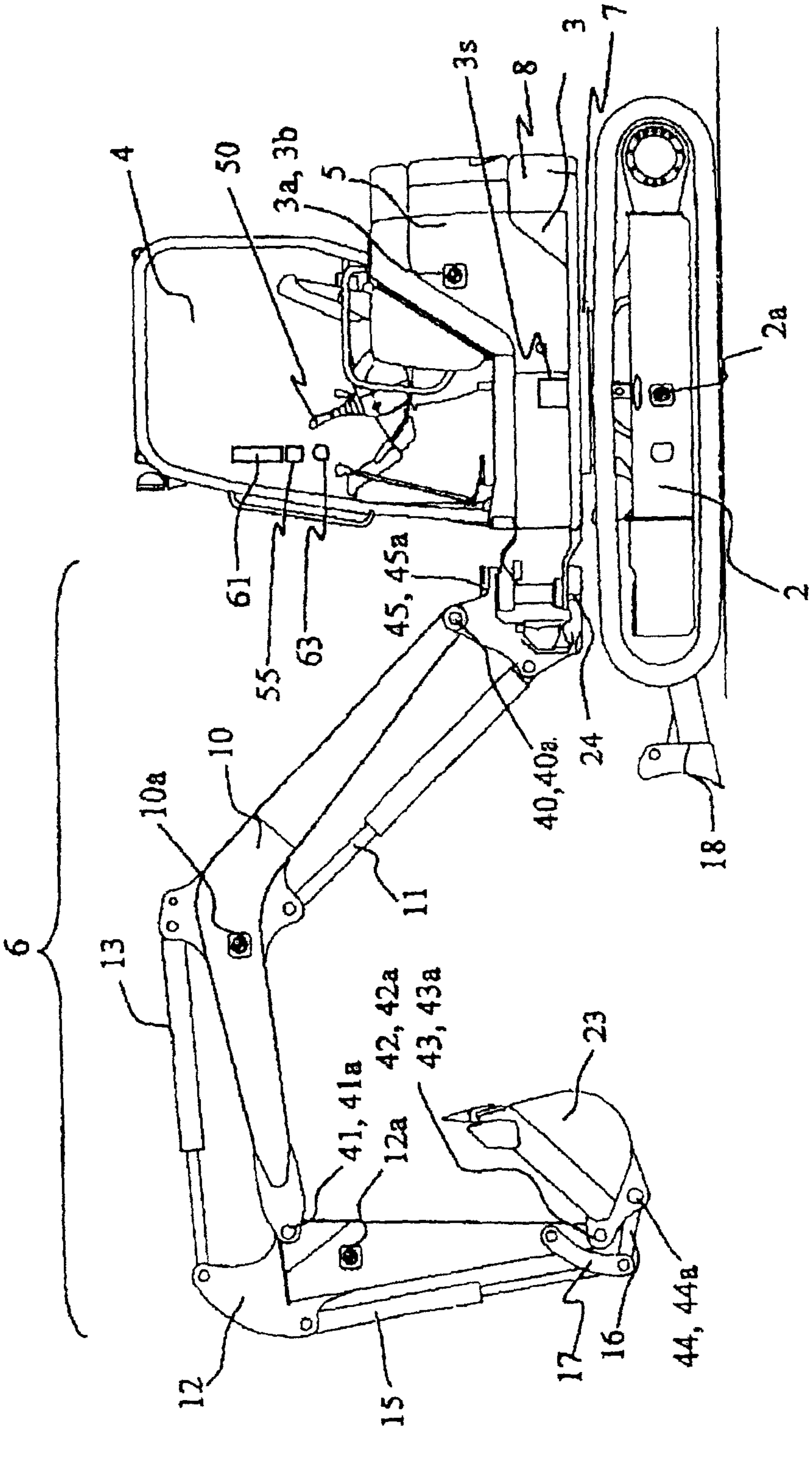
FIG. 10 is a schematic side view showing a computing model of a working machine according to a second embodiment.
Figure 11:
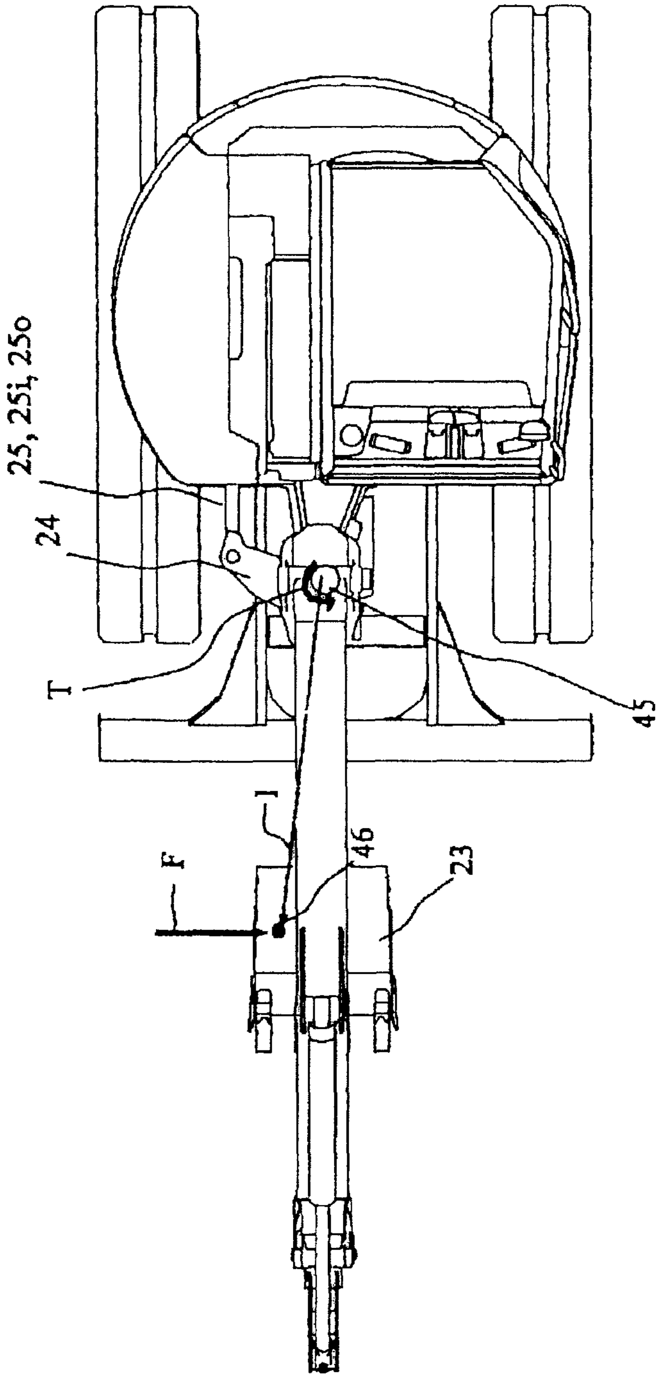
FIG. 11 is a schematic top plan view showing the computing model of the working machine.

The second embodiment of the present invention will next be described with reference to FIG. 10 and FIG. 11. FIG. 10 is a schematic side view showing a working machine according to the second embodiment, and FIG. 11 is a top plan view showing an upperstructure in the second embodiment by modeling it. In FIG. 10 and FIG. 11, similar elements of structure as the corresponding ones in the first embodiment are identified by like signs, and their description is omitted.

The second embodiment is different from the first embodiment in that a swing mechanism, which performs a horizontal swing, is arranged between an upperstructure 3 and a boom 10. A description will hereinafter be made primarily about this difference from the first embodiment.

<Hardware Configuration>

<Main Body>

As shown in FIG. 10, in the working machine 1*a* according to the second embodiment, the upperstructure 3 is rotatably mounted on an undercarriage 2, and the upperstructure 3 is driven by a swing motor 7. On the upperstructure 3, an operator's cab 4, a counterweight 8 and the like are mounted. On a front part of the upperstructure 3, a swing post 24 is arranged pivotally at a fulcrum 45. The swing post 24 is horizontally swung by a swing cylinder 25 (see FIG. 11) connected to the upperstructure 3 and the swing post 24. In addition, the working machine 1*a* is also provided with a controller 80 that controls the entire working machine 1*a*.

<Front Working Mechanism>

On the swing post 24, the boom 10 is arranged pivotally up and down at a fulcrum 40, and on the boom 10, an arm 12 is arranged pivotally at a fulcrum 41. Further, on the arm 12, a bucket 23 is arranged pivotally at a fulcrum 42. Like the first embodiment, the boom 10 and arm 12 make up a front working mechanism 6.

As also shown in FIG. 10, a boom cylinder 11 is arranged to drive the boom 10, and is connected to the swing post 24 and boom 10. The arm 12 is driven by an arm cylinder 13, and the bucket 23 is driven by a working attachment cylinder 15.

<Operator's Cab>

The upperstructure 3 is provided with the operator's cab 4 for an operator who operates the working machine 1a. Arranged in the operator's cab 4 are, as in the first embodiment, a control device 50, a display 61, and a warning device 63.

<Sensors>

The working machine 1a is provided, as in the first embodiment, with a swing angle sensor 3s, posture sensor 3b, boom angle sensor 40a, arm angle sensor 41a, bucket angle sensor 42a, undercarriage acceleration sensor 2a, upperstructure acceleration sensor 3a, boom acceleration sensor 10a, and arm acceleration sensor 12a.

<Swing Angle Sensor>

In addition to these sensors, a swing angle sensor 45a is also arranged at the fulcrum 45 between the upperstructure 3 and the swing post 24 to detect a rotational angle of the swing post 24.

<Swing Pressure Sensors>

As shown in FIG. 11, swing pressure sensors 25i and 25o are arranged on a suction side and delivery side of a hydraulic pressure, which is driving the swing post cylinder 25, to detect a suction-side pressure and delivery-side pressure.

<Controller>

Figure 12:
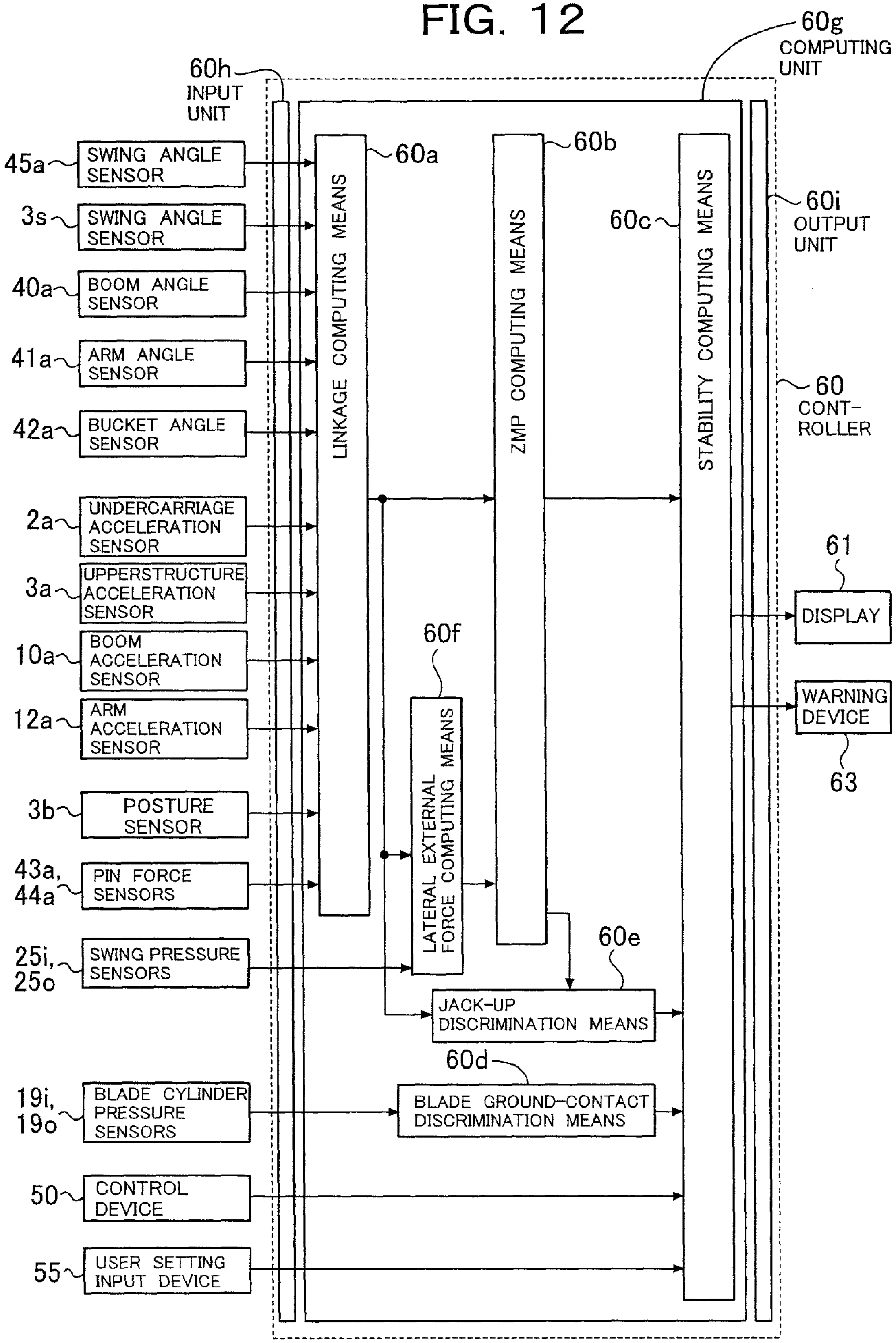
FIG. 12 is a simplified configuration diagram of a controller arranged in the working machine.

FIG. 12 is a schematic configuration diagram of a controller arranged in the working machine according to the second embodiment. Among function blocks of the controller 80 as illustrated in FIG. 10, like function blocks as the corresponding ones of the controller 60 in the first embodiment are identified by like signs, and their description is omitted.

<Lateral External Force Computing Means>

As it is difficult to directly measure an external force applied in the lateral direction to the bucket 23 (see FIG. 10), it is calculated from the suction-side pressure and delivery-side pressure of the hydraulic pressure, which is driving the swing cylinder 25, as detected by the swing pressure sensors 25i and 25o arranged at the swing cylinder 25 (see FIG. 11). More specifically, the model illustrated in FIG. 11 is used.

First, a swing torque Tz45 applied about the fulcrum 45 of the swing post 24 is calculated from a difference in pressure between the suction-side pressure and the delivery-side pressure detected by the swing pressure sensors 25i and 25o arranged at the swing cylinder 25. By performing a linkage computation with detection values of the swing angle sensor 45a, boom angle sensor 40a, arm angle sensor 41a and bucket angle sensor 42a (see FIG. 10) which the front working mechanism 6 is provided with, a distance vector l from the fulcrum 45 of the swing post 24 to an acting point 46 of lateral external force on the bucket 23 is next calculated. A Y-component, Fy46 (=Tz3/lx45), of a lateral external force applied to the acting point 46 of lateral external force can now be calculated by dividing the swing torque Tz45 with an X-direction component lx45 of the distance vector l from the fulcrum 45 to the acting point 46 of lateral external force.

<Linkage Computing Means>

By sequentially performing kinematic calculations with values of the posture sensor 3b, swing angle sensor 3s, swing angle sensor 45a, boom angle sensor 40a, arm angle sensor 41a, bucket angle sensor 42a, undercarriage acceleration sensor 2a, upperstructure acceleration sensor 3a, boom acceleration sensor 10a, arm acceleration sensor 12a and pin force sensors 43a, 44a, which are arranged at the various parts of the working machine 1a as shown in FIG. 10, and the lateral external force vector F46, position vectors r2, r3, r10, r12 at the respective mass points, acceleration vectors r"2,r"3,r"10, r"12 at the respective mass points, position vectors s43, s44 at the respective acting points of external forces, and respective external force vectors F43,F44,F46 are then converted to values based on the machine reference coordinate system (O-XYZ).

<Stability Computing Means>

In the second embodiment, a stability computing means 60c also calculates ZMP coordinates by using the results of the linkage computation and performs a discrimination of stability in a similar manner as in the first embodiment.

It is to be noted that in the second embodiment, various sensors can also be changed or omitted as in the first embodiment. Further, a configuration which is not provided with the upperstructure 3 may also be adopted.

Third Embodiment

<Offset Type>

Figure 13:
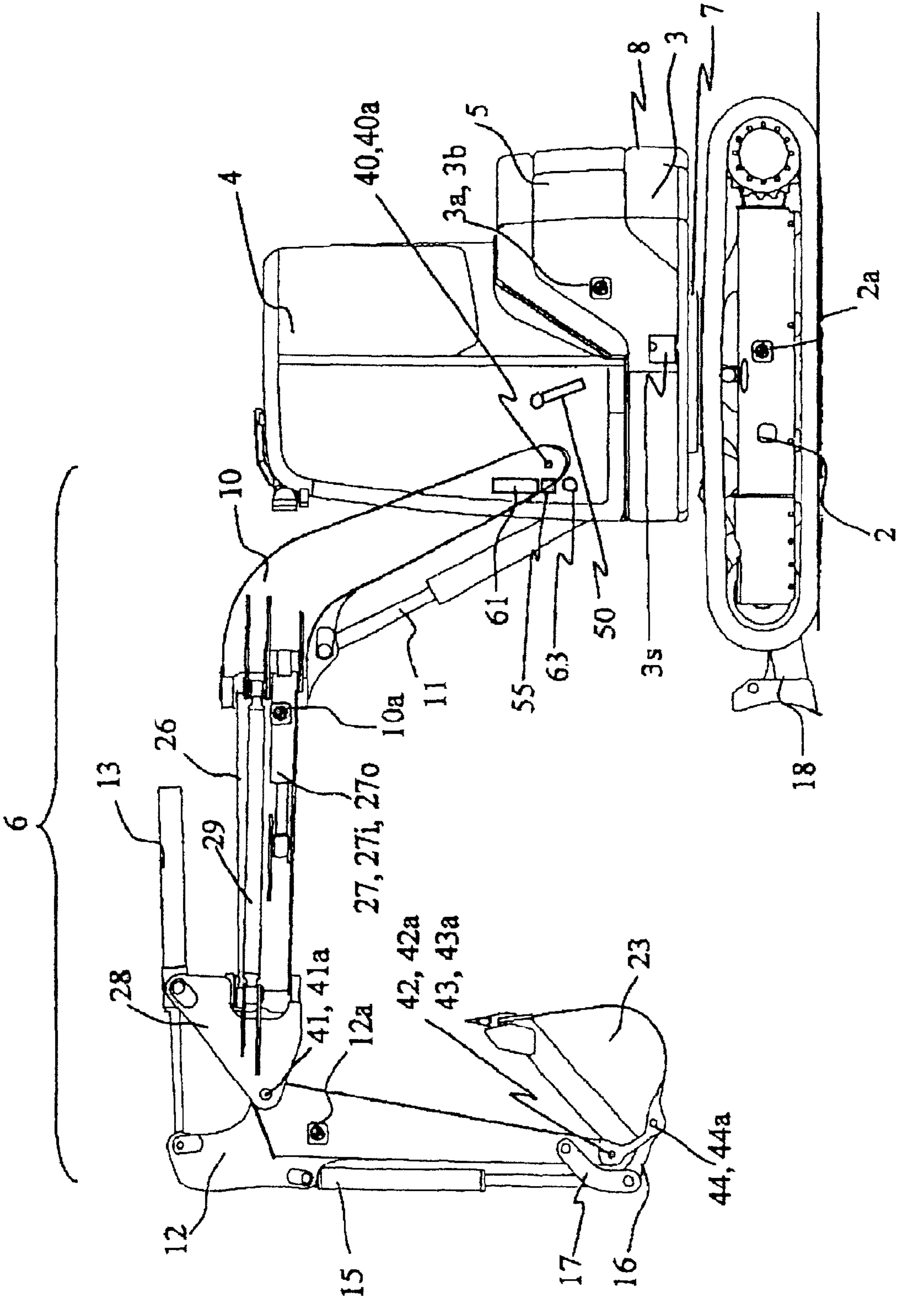
FIG. 13 is a schematic side view showing a computing model of a working machine according to a third embodiment.
Figure 14:
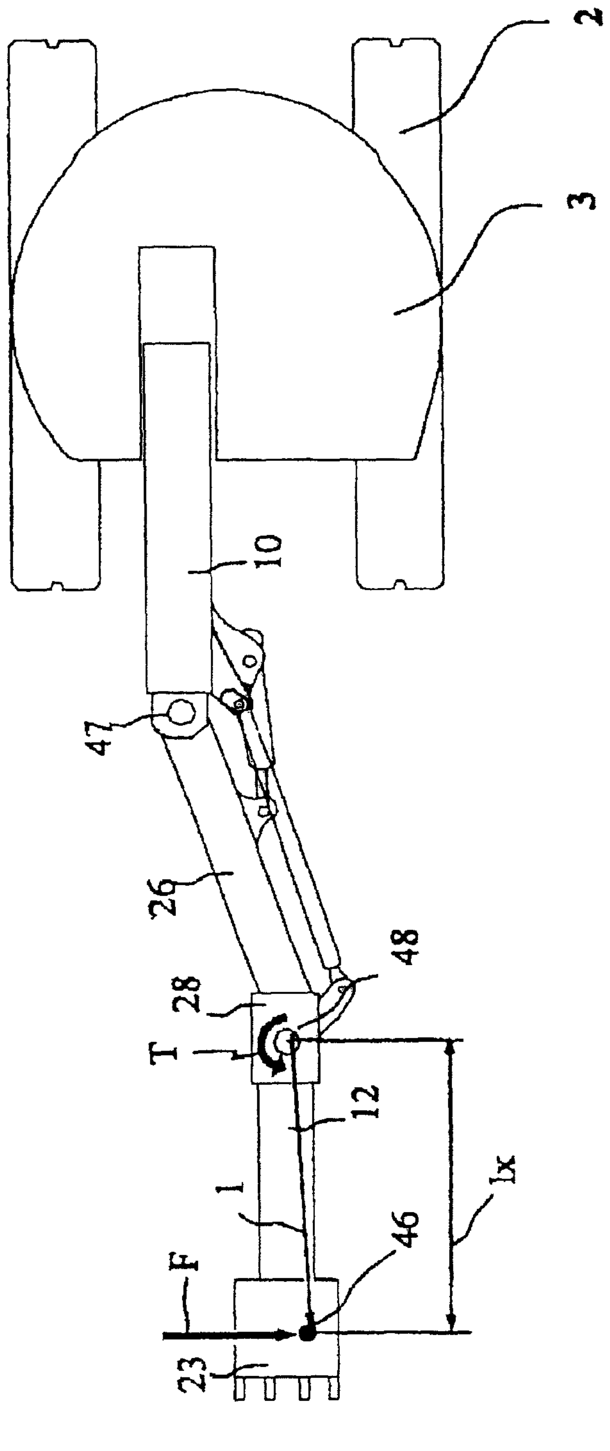
FIG. 14 is a schematic top plan view showing the computing model of the working machine.

The third embodiment of the present invention will be described with reference to FIG. 13 and FIG. 14. FIG. 13 is a schematic side view showing a working machine according to the third embodiment, and FIG. 14 is a top plan view showing an upperstructure in the third embodiment by modeling it. In FIG. 13 and FIG. 14, similar elements of structure as the corresponding ones in the first embodiment are identified by like signs, and their description is omitted.

The third embodiment is different from the first embodiment in that it has, as a horizontal pivot mechanism, an offset mechanism which allows the front working mechanism 6 to undergo a horizontal translation at its front part beyond an arm 12. A description will hereinafter be made primarily about this difference from the first embodiment.

<Hardware Configuration>

<Main Body>

As shown in FIG. 13, the working machine 1b according to the third embodiment is primarily constructed of an undercarriage 2, an upperstructure 3, and a swing motor 7 for driving the upperstructure 3. On the upperstructure 3, an operator's cab 4, a counterweight 8 and the like are mounted. In addition, the working machine 1b is also provided with a controller 90 that controls the entire working machine 1b.

<Front Working Mechanism>

The front working mechanism 6 is provided with a boom (lower boom) 10 arranged pivotally up and down on the upperstructure 3, an upper boom 26 arranged on a free end side of the boom 10, an arm support 28 arranged on a free end side of the upper boom 26, the arm 12 pivotally arranged on a free end side of the arm support 28, a bucket 23 pivotally attached to a free end side of the arm 12, a link rod 29 connecting between the boom 10 and the arm support 28, a boom cylinder 11 for driving the boom 10, an arm cylinder 13 for driving the arm 12, a working attachment cylinder 15 for driving the bucket 23, and an offset cylinder 27 for horizontally pivoting the upper boom 26.

As shown in FIG. 14, the front working mechanism 6 changes pivot angles at a fulcrum 47 between the boom 10 and the upper boom 26 and at a fulcrum 48 between the upper boom 26 and the arm support 28 by way of the offset cylinder 27, so that the upper boom 26 is brought into a state that it has undergone a horizontal translation (offset) relative to the lower boom 10. The working machine 1*b* according to the third embodiment can perform, for example, digging work of trenches or the like alongside a road by actuating the cylinders for the boom 10, the arm 12 and a working attachment such as the bucket 23 with the front working attachment 6 being kept in an offset state as described above.

<Operator's Cab>

In addition, the upperstructure 3 is provided with the operator's cab 4 for an operator who operates the working machine 1*b*. Arranged in the operator's cab 4 are, as in the first embodiment, a control device 50, a display 61, and a warning device 63.

<Sensors>

As shown in FIG. 13, the working machine 1*b* is provided, as in the first embodiment, with a swing angle sensor 3*s*, posture sensor 3*b*, boom angle sensor 40*a*, arm angle sensor 41*a*, bucket angle sensor 42*a*, undercarriage acceleration sensor 2*a*, upperstructure acceleration sensor 3*a*, boom acceleration sensor 10*a*, and arm acceleration sensor 12*a*.

<Offset Angle Sensor>

In addition to the above-described respective sensors, an offset angle sensor 48*a* is also arranged, as shown in FIG. 14, at the offset fulcrum 48 to detect a pivot angle at the fulcrum 48.

<Offset Pressure Sensors>

Moreover, the offset cylinder 27 is provided with offset pressure sensors 27*i* and 27*o* to detect a suction-side pressure and delivery-side pressure of a hydraulic pressure that is driving the offset cylinder 27.

<Controller>

Figure 15:
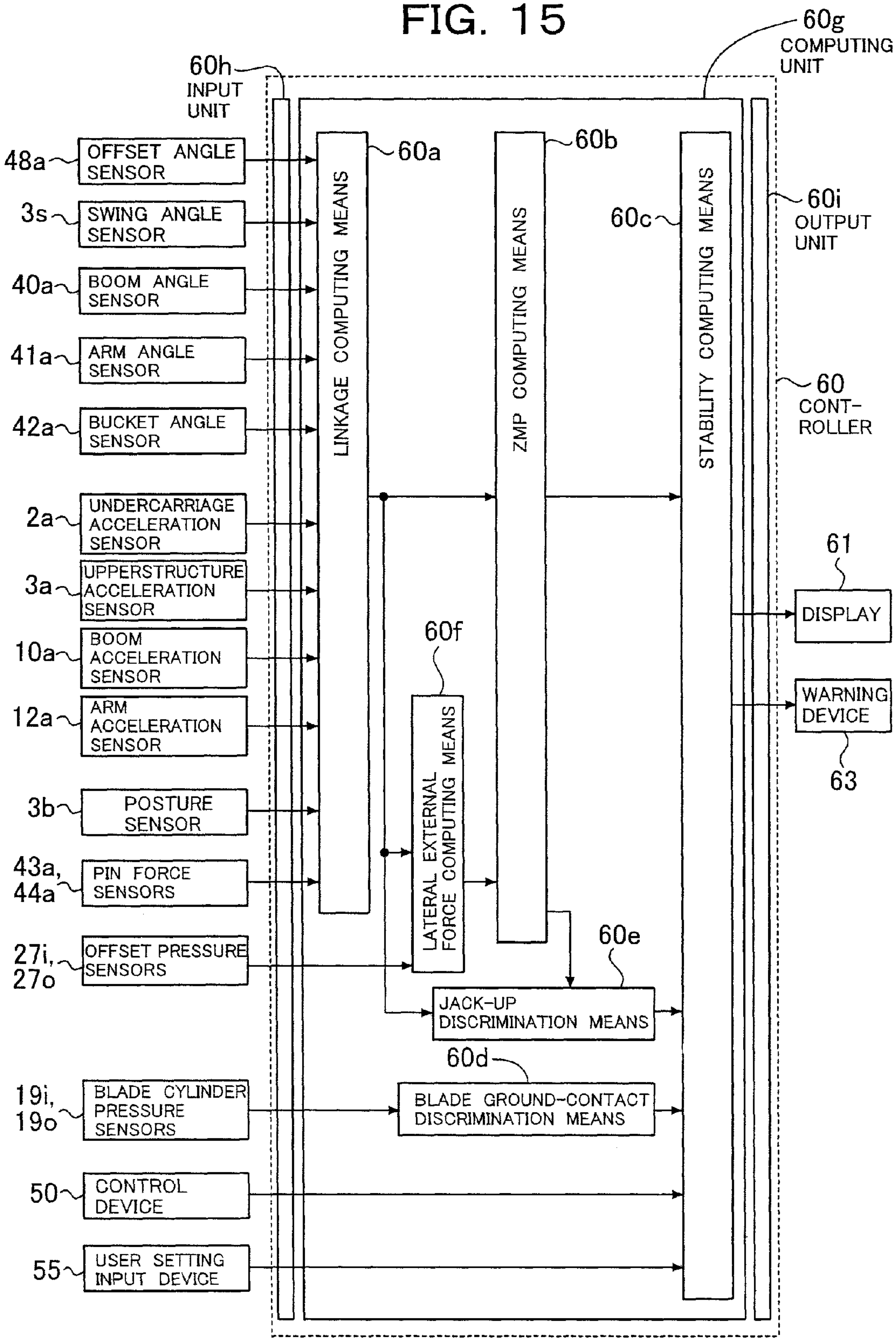
FIG. 15 is a simplified configuration diagram of a controller arranged in the working machine.

FIG. 15 is a schematic configuration diagram of a controller arranged in the working machine according to the third embodiment. Among function blocks of the controller 90 as illustrated in FIG. 15, similar function blocks as the corresponding ones of the controller 60 in the first embodiment are identified by like signs, and their description is omitted accordingly.

<Lateral External Force Computing Means>

As it is difficult to directly measure an external force applied in the lateral direction to the bucket 23 as shown in FIG. 14, it is calculated from a suction-side pressure and delivery-side pressure of a hydraulic pressure, which is driving the offset cylinder 27. More specifically, the model illustrated in FIG. 14 is used.

First, a swing torque Tz48 applied about the offset fulcrum 48 is calculated from a difference in pressure between the suction-side pressure and delivery-side pressure detected by the offset pressure sensors 27*i* and 27*o* arranged at the offset cylinder 27.

By performing a linkage computation with detection values of the boom angle sensor 40*a*, arm angle sensor 41*a*, bucket angle sensor 42*a* and offset angle sensor 48*a* (see FIG. 13) which the front working mechanism 6 is provided with, a distance vector l from the offset fulcrum 48 to an acting point 46 of lateral external force on the bucket 23 is next calculated. AY-component, Fy46 (=Tz3/lx48), of a lateral external force applied to the acting point 46 of lateral external force can now be calculated by dividing the swing torque Tz48 with an X-direction component lx48 of the distance vector 1.

<Linkage Computing Means>

By sequentially performing kinematic calculations with respective detection values of the posture sensor 3*b*, swing angle sensor 3*s*, boom angle sensor 40*a*, arm angle sensor 41*a*, bucket angle sensor 42*a*, offset angle sensor 48*a*, undercarriage acceleration sensor 2*a*, upperstructure acceleration sensor 3*a*, boom acceleration sensor 10*a*, arm acceleration sensor 12*a* and pin force sensors 43*a*,44*a*, which are arranged at the various parts of the working machine 1*b* as shown in FIG. 13, and the lateral external force vector F46, position vectors r2, r3, r10, r12 at the respective mass points, acceleration vectors r"2,r"3,r"10,r"12 at the respective mass points, position vectors s43, s44 at the respective acting points of external forces and respective external force vectors F43,F44,F46 are then converted to values based on the machine reference coordinate system (O-XYZ).

<Stability Computing Means>

Using the results of the linkage computation, a stability computing means 60*c* also calculates ZMP coordinates and performs a discrimination of stability in a similar manner as in the first embodiment.

It is to be noted that in the third embodiment, various sensors can also be changed or omitted as in the first embodiment. Further, a configuration which is not provided with the upperstructure 3 may also be adopted.

As has been described above, this embodiment makes it possible to calculate moment by moment the dynamic stability including an inertia force of the front working mechanism and an external force during an operation and to provide the operator with information on the safety without delay. It is, therefore, possible to reduce the possibility of tipping of the working machine by an unreasonably aggressive operation and to provide a working machine of high safety.

By detecting a motion, such as a contact of the blade with the ground or a jack-up, that the state of contact between the working machine and the ground surface changes and by changing the stable range, the safety can be accurately determined to enhance the stability even when the state of contact with the ground changes.

Fourth Embodiment

Figure 16:
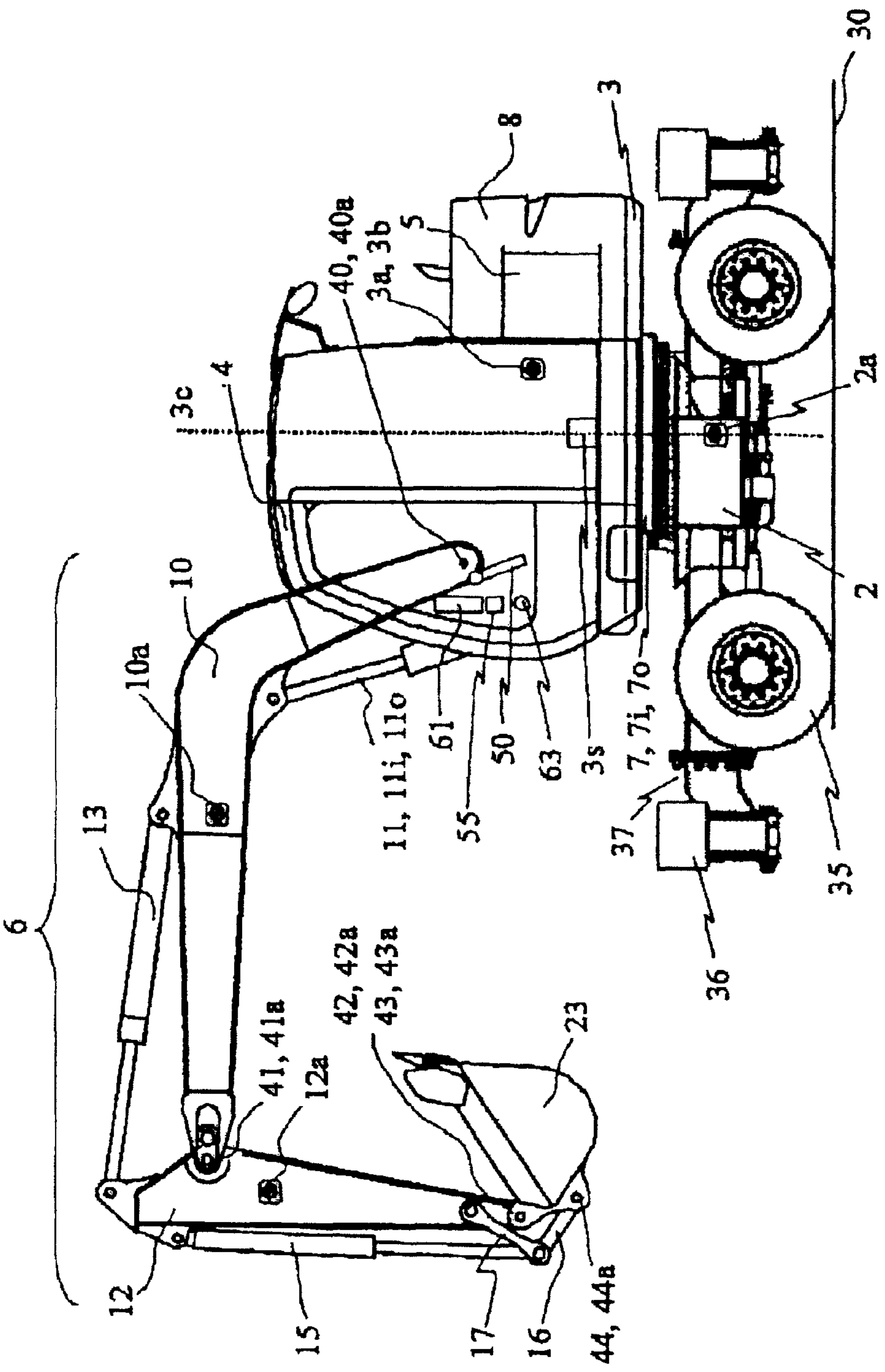
FIG. 16 is a schematic side view showing a working machine according to a fourth embodiment.
Figure 17A:
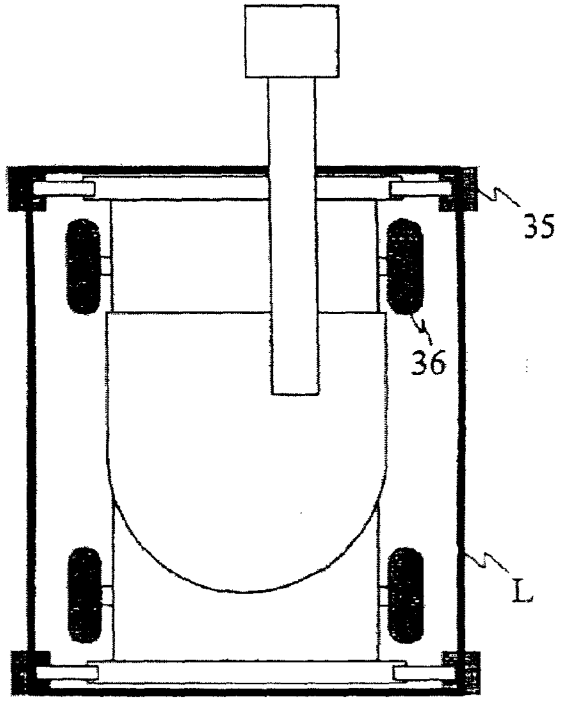
FIGS. 17(*a*) through 17(*c*) are diagrams illustrating examples of a support polygon relating to the fourth embodiment.
Figure 17B:
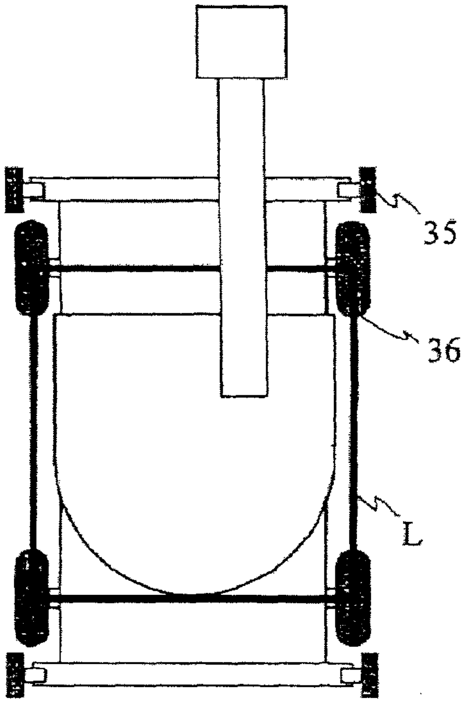
Figure 17C:
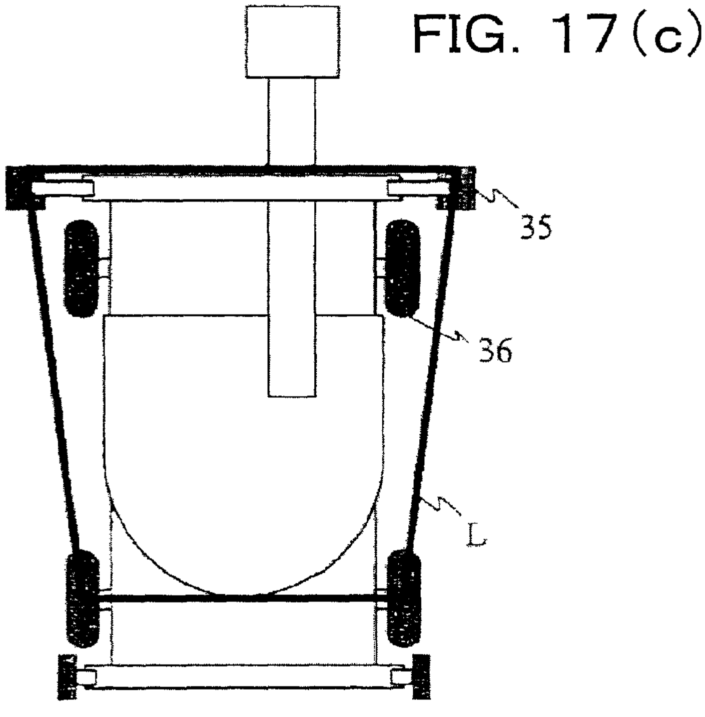

The fourth embodiment of the present invention will be described with reference to FIG. 16 and FIGS. 17(*a*) to 17(*c*). FIG. 16 is a schematic side view showing a working machine according to the fourth embodiment, and FIGS. 17(*a*) to 17(*c*) are diagrams showing examples of a support polygon in the fourth embodiment. In FIG. 16 and FIGS. 17(*a*) to 17(*c*), similar elements of structure as the corresponding ones in the first embodiment are identified by like signs, and their description is omitted.

The fourth embodiment is different from the first embodiment in that it has wheels at a travel base of an undercarriage 2. A description will hereinafter be made primarily about this difference from the first embodiment.

<Hardware Configuration>

<Main body>

As shown in FIG. 16, the working machine 1*c* according to the fourth embodiment is primarily constructed of the undercarriage 2, an upperstructure 3, and a swing motor 7 for driving the upperstructure 3. On the upperstructure 3, an operator's cab 4, a counterweight 8 and the like are mounted. In addition, the working machine 1*c* is also provided with a controller 90 that controls the entire working machine 1*c*.

<Undercarriage>

The undercarriage 2 is constructed of wheels 35, stabilizers 36, stabilizer cylinders 37, and frames, axles and the like which support these wheels, stabilizers and stabilizer cylinders. The stabilizers 36 are driven by the stabilizer cylinders 37, respectively.

<Front Working Mechanism, Operator's Cab>

The construction of the front working mechanism 6 is similar to that in the first embodiment. Arranged in the operator's cab 4 are, as in the first embodiment, a control device 50, a display 61, and a warning device 63.

<Sensors>

As shown in FIG. 16, the working machine 1*c* is provided, as in the first embodiment, with a swing angle sensor 3*s*, posture sensor 3*b*, boom angle sensor 40*a*, arm angle sensor 41*a*, bucket angle sensor 42*a*, undercarriage acceleration sensor 2*a*, upperstructure acceleration sensor 3*a*, boom acceleration sensor 10*a*, and arm acceleration sensor 12*a*.

<Controller>

The basic configuration of the controller 60 is similar to that in the first embodiment as illustrated in FIG. 2. Among function blocks of the controller 60, similar function blocks as the corresponding ones in the first embodiment are identified by like signs, and their description is omitted accordingly.

<Stability Computing Means>

A stability computing means 60*c* performs, as in the first embodiment, a discrimination of stability on the basis of the coordinates of a ZMP 70 as calculated by a ZMP computing means 60*b*. The stability computing means 60*c* calculates a support polygon L formed by the working machine 1 and a ground surface 30, and with respect to the support polygon L, sets a normal region J where the possibility of tipping is sufficiently low and a tipping warning region N where the possibility of tipping is higher. When the coordinates of the ZMP 70 are in the normal region J, the stability computing means 60*c* outputs information on the stability to the display 61. When the coordinates of the ZMP 70 are in the tipping warning region N, on the other hand, the stability computing means 60*c* outputs information on the stability and a tipping warning to the display 61 and warning device 63, respectively.

FIGS. 17(*a*) to 17(*c*) are diagrams illustrating examples of a support polygon L in the fourth embodiment. When the front, rear, left and right stabilizers 36 have all been brought into contact with the ground as illustrated in FIG. 17(*a*), the support polygon L takes a quadrilateral shape formed by connecting the ground contact points of the front, rear, left and right stabilizers 36. When pivotal stabilizers are equipped and are pivoted, the support polygon L takes a quadrilateral shape formed by connecting ground contact points of the stabilizers, which are located in ground contact areas of the stabilizers at positions right below a center line of a pivotal motion. When fixed stabilizers are equipped, on the other hand, the support polygon L takes a quadrilateral shape formed by connecting points, which are located in ground contact areas of the stabilizers and are farthermost from centers of the ground contact areas. When the stabilizers are kept out of contact with the ground, a quadrilateral shape formed by connecting ground contact points of the front, rear, left and right wheels 35 as illustrated in FIG. 17(*b*) is used as the support polygon L. For a wheeled working machine equipped with no stabilizers, the support polygon L is similar to that of FIG. 17(*b*). When only the front, rear, left or right ones of the stabilizers 36 are brought into contact with the ground or stabilizers 36 are arranged on only the front, rear, left or right side, the support polygon L takes a quadrilateral shape formed by connecting ground contact points of the ground-contacting stabilizers 36 and ground contact points of the wheels 35 in the directions where the front, rear, left or right ones of the stabilizers 36 are not in contact with the ground. When only the two front stabilizers are brought into contact with the ground and the two rear stabilizers are kept out of contact with the ground, the support polygon L is similar to that of FIG. 3(*c*).

In the calculation of the support polygon L, whether or not the stabilizers 36 are in contact with the ground may be changed based on setting by the operator, or the stability computing means 60*c* may be configured to determine it automatically. As a method for automatically determining whether or not the stabilizers 36 are in contact with the ground, it is possible to contemplate a method that provides each stabilizer or each stabilizer cylinder 37 with a posture sensor and determines from the posture of the stabilizer whether or not the stabilizer is in contact with the ground or a method that provides each stabilizer cylinder 37 with pressure sensors and determines from detected pressure values whether or not the corresponding stabilizer is in contact with the ground.

A boundary K between the normal region J and the tipping warning region N is set inside the support polygon L. The boundary K is determined as in the first embodiment.

It is to be noted that in the fourth embodiment, various sensors can be also changed or omitted as in the first embodiment. Further, the configuration may be adopted without the upperstructure 3.

The first to fourth embodiments according to the present invention have been described above. In each of these embodiments, however, it is possible to change the conditions for stability discretion corresponding to the operating conditions of the working machine and to discriminate the stability of the working machine on the basis of the changed conditions for stability discretion. It is, therefore, possible to bring about the excellent advantageous effect that the operator can confirm the stability moment by moment corresponding to the operating conditions of the working machine and work of high safety can be performed.

In each embodiment described above, one having crawlers as the undercarriage 2 was described by way of example. The present invention can, however, be equally applied even when the working machine is provided as the undercarriage 2 with other elements such as tracks.

In each embodiment described above, the description was made taking, as the working machine 1, the hydraulic excavator by way of example. However, the present invention can be applied to any working machine insofar as it has a travel base and a front working mechanism.

In each embodiment described above, the description was made under the assumption that work is actually performed using the working machine 1. However, the present invention may also be practiced by applying it to a simulator or the like.

In each embodiment described above, the lumped mass model was used as a model for computing the ZMP 70. However, the working machine may be configured to practice the present invention based on another modeling format such as a rigid model.

In each embodiment described above, the description was made based on the working machine 1 provided with the upperstructure 3. The working machine 1 may be without the upperstructure 3. In this case, the front working mechanism 6 is configured to be directly arranged on the undercarriage 2. Further, the working machine is configured such that the posture sensor 3*b* is arranged on the undercarriage 2 and neither the swing angle sensor 3*s* nor the upperstructure 3*a* is arranged.

| Legend | |
|---|---|
| 1, 1a, 1b | Working machines |
| 2 | Undercarriage |
| 2a | Undercarriage acceleration sensor (undercarriage speed sensing means) |
| 3 | Upperstructure |
| 3a | Upperstructure acceleration sensor (upperstructure speed sensing means) |
| 3b | Posture sensor |
| 3c | Center line of rotation |
| 3s | Swing angle sensor |
| 4 | Operator's cab |
| 6 | Front working mechanism |
| 7 | Swing motor |
| 7i, 7o | Swing motor pressure sensors |
| 10 | Boom (front working mechanism) |
| 10a | Boom acceleration sensor (acceleration sensor, boom speed sensing means) |
| 12 | Arm (front working mechanism) |
| 12a | Arm acceleration sensor (acceleration sensor, arm speed sensing means) |
| 13 | Arm cylinder |
| 15 | Working attachment cylinder |
| 18 | Blade |
| 19 | Blade cylinder |
| 19i, 19o | Blade cylinder pressure sensors |
| 23 | Bucket (working attachment) |
| 30 | Ground surface |
| 32 | Sprocket (drive tumbler) |
| 33 | Idler (idler tumbler) |
| 34 | Lower rollers |
| 35 | Wheels |
| 36 | Stabilizers |
| 37 | Stabilizer cylinders |
| 40, 41, 42 | Fulcrums |
| 40a | Boom angle sensor (angle sensor) |
| 41a | Arm angle sensor (angle sensor) |
| 42a | Bucket angle sensor |
| 43, 44 | Pins |
| 43a, 44a | Pin force sensors |
| 46 | Acting point of lateral external force |
| 50 | Control lever |
| 55 | User setting input device |
| 60, 80, 90 | Controllers |
| 60a | Linkage computing means |
| 60b | ZMP computing means |
| 60c | Stability computing means |
| 60d | Blade ground-contact determination means |
| 60e | Jack-up determination means |
| 60f | Lateral external force computing means |
| 61 | Display (display means) |
| 63 | Warning device (warning means) |
| 70 | ZMP coordinates |
| L | Support polygon |
| J | Normal region |
| N | Tipping warning region |
| K | Boundary |
| 2P, 3P, 10P, 12P | Mass points (barycentric positions) |

The invention claimed is:

1. A working machine provided with an undercarriage, a working machine main body mounted on the undercarriage, a front working mechanism attached pivotally in an up-and-down direction to the working machine main body, and a working attachment connected to a free end of the front working mechanism, comprising:

a ZMP computing means operably arranged to calculate coordinates of a ZMP by using position information, acceleration information and external force information on respective movable portions of the main body, which includes the front working mechanism, and undercarriage; and a stability computing means operably arranged to calculate a support polygon formed by plural ground points of the working machine with a ground, performing a discrimination of stability based on the calculated ZMP coordinates, and, when the ZMP is included in a warning region formed inside a perimeter of the support polygon, producing a tipping warning, wherein the ZMP computing means and stability computing means compute the ZMP and the support polygon including the warning region therein, and produce a display or warning.

2. The working machine according to claim 1, further comprising:

at least one of an angle sensor for detecting an operating angle of the working machine, an acceleration sensor for detecting an operating acceleration of the working machine, and a pin force sensor for detecting an external force applied to a pin that connects the front working mechanism and the working attachment together, wherein the ZMP computing means calculates, based on an output value of the at least one sensor, position vectors, acceleration vectors and external force vectors at the respective movable portions of the main body, which includes the front working mechanism, and undercarriage.

3. The working machine according to claim 1, wherein:

the stability computing means sequentially changes the support polygon, warning region and stability according to work conditions or an operator's instruction.

4. The working machine according to claim 3, wherein:

the undercarriage is provided with a blade connected pivotally up and down, a blade cylinder for driving the blade, blade cylinder pressure sensors for detecting a suction-side pressure and delivery-side pressure of a hydraulic pressure that is driving the blade cylinder, and a blade ground-contact determination means for determining a state of contact of the blade with the ground based on a pressure difference between the suction-side pressure and delivery-side pressure of the blade cylinder pressure sensors, and the stability computing means changes a shape of the support polygon when the blade ground-contact determination means determines that the blade has come into contact with the ground.

5. The working machine according to claim 3, further comprising:

a jack-up determination means for determining, based on an external force applied to a pin connecting the working attachment to the front working mechanism as detected by the pin force sensor and a tilt angle of the undercarriage as obtained by a posture sensor for detecting the tilt angle of the undercarriage, whether or not the working machine has been jacked up by the front working mechanism, wherein the stability discrimination means changes a shape of the support polygon when the jack-up determination means determines that the working machine is in a jacked-up state.

6. The working machine according to claim 3, further comprising:

a boom attached pivotally up and down to the undercarriage, and an arm connected pivotally to the boom via a joint;

a boom speed detection means operably arranged to detect an operating speed of the boom and an arm speed detection means for detecting an operating speed of the arm; and an undercarriage speed detection operably arranged to detect a traveling speed of the undercarriage, wherein the stability computing means changes a size of the warning region based on known masses of the undercarriage, the boom and the arm, the traveling speed of the undercarriage as detected by the undercarriage speed detection means, the operating speed of the boom as detected by the boom speed detection means, and the operating speed of the arm as detected by the arm speed detection means.

* * * * *